(12) United States Patent
Nagoshi et al.

(10) Patent No.: US 6,234,901 B1
(45) Date of Patent: May 22, 2001

(54) GAME DEVICE, PICTURE DATA AND FLARE FORMING METHOD

(75) Inventors: Toshihiro Nagoshi; Takuji Masuda; Koki Koiwa; Takayuki Kazama; Ryo Ikawa, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 08/975,966

(22) Filed: Nov. 21, 1997

(30) Foreign Application Priority Data

Nov. 22, 1996 (JP) .................................................. 8-312459

(51) Int. Cl.$^7$ ...................................................... A63F 9/24
(52) U.S. Cl. .................................. 463/33; 463/30; 463/1; 345/426
(58) Field of Search .................................. 463/30, 31, 32, 463/33, 34; 345/426, 475, 421, 473, 422, 418, 112–115, 133, 135; 434/38, 43, 44, 62, 69

(56) References Cited

U.S. PATENT DOCUMENTS

| | | | |
|---|---|---|---|
| 4,865,423 | * | 9/1989 | Doi ...................................... 345/133 |
| 5,249,264 | * | 9/1993 | Matsumoto ........................... 345/133 |
| 5,268,996 | * | 12/1993 | Steiner et al. ........................ 345/427 |
| 5,428,716 | * | 6/1995 | Brokenshire et al. ................ 345/133 |
| 5,616,079 | * | 4/1997 | Iwase et al. ............................. 463/32 |
| 5,786,822 | * | 7/1998 | Sakaibara et al. .................... 345/430 |
| 5,947,823 | * | 9/1999 | Nimura .................................... 463/32 |
| 6,018,350 | * | 1/2000 | Lee et al. .............................. 345/426 |
| 6,130,672 | * | 10/2000 | Yamazaki et al. .................... 345/427 |

* cited by examiner

Primary Examiner—Mark Sager
Assistant Examiner—John M. Hotaling, II
(74) Attorney, Agent, or Firm—Finnegan, Henderson, Farabow, Garrett & Dunner, L.L.P.

(57) ABSTRACT

It is an object of the present invention to provide special effects which will make a video game more realistic.

When a virtual light source exists in a three-dimensional virtual space, if a light from the light source extends toward a camera, a flare is generated on a screen because of incidence of the ray of light into a camera lens, thereby forming a dazzling picture in accordance with the state of backlight.

15 Claims, 23 Drawing Sheets

FIG.7(a)

| ANGLE θ | $\theta_1$ | $\theta_2$ | ... | $\theta_n$ |
|---|---|---|---|---|
| FLARE DEGREE C | $C_1$ | $C_2$ | ... | $C_n$ |

FIG.7(b)

| | POSITION WITHIN VIEW (ANGLE θ) | | | | | | |
|---|---|---|---|---|---|---|---|
| | $\theta_1$ | $\theta_2$ | $\theta_3$ | $\theta_4$ | ... | ... | $\theta_n$ |
| INTENSITY OF LIGHT SOURCE  P1 | $C_{11}$ | $C_{12}$ | $C_{13}$ | $C_{14}$ | | ... | $C_{1n}$ |
| P2 | $C_{21}$ | | | | | | |
| : | : | | FLARE DEGREE C | | | | : |
| Pn | $C_{1n}$ | ... | ... | | | | $C_{nn}$ |

| RAM 0 | RAM 1 | RAM 2 | RAM 3 | RAM 4 |
|---|---|---|---|---|
| X0, Tx1 ΔQ | | | | |

TOP →|

| TOP MARK |
|---|
| 0 |

(b)

| RAM 0 | RAM 1 | RAM 2 | RAM 3 | RAM 4 |
|---|---|---|---|---|
| X0, X1 Q | X1, Tx2 ΔQ | | | |

TOP →|

| TOP MARK |
|---|
| 1 |

(c)

| RAM 0 | RAM 1 | RAM 2 | RAM 3 | RAM 4 |
|---|---|---|---|---|
| X0, X1 Q | X1, X2 Q | X2, Tx3 ΔQ | | |

TOP →|

| TOP MARK |
|---|
| 2 |

(d)

| RAM 0 | RAM 1 | RAM 2 | RAM 3 | RAM 4 |
|---|---|---|---|---|
| X0, X1 Q | X1, X2 Q | X2, X3 Q | X3, Tx4 ΔQ | |

TOP →|

| TOP MARK |
|---|
| 3 |

(e)

| RAM 0 | RAM 1 | RAM 2 | RAM 3 | RAM 4 |
|---|---|---|---|---|
| X0, X1 Q | X1, X2 Q | X2, X3 Q | X3, X4 Q | X4, Tx5 ΔQ |

TOP →|

| TOP MARK |
|---|
| 4 |

| CAMERA | 0 | 1 | 2 | 3 | 4 | 5 | 6 | 7 | 8 | ---- | MAX |
|---|---|---|---|---|---|---|---|---|---|---|---|
| POLY 0 | 1 | 1 | 1 | 0 | 0 | 0 | 0 | 0 | 0 | ------- | |
| POLY 1 | 1 | 1 | 1 | 0 | 0 | 0 | 0 | 0 | 0 | ----- | 0 |
| POLY 2 | 1 | 1 | 0 | 0 | 0 | 0 | 0 | 0 | 0 | ----- | 0 |
| POLY 3 | 0 | 0 | 1 | 0 | 0 | 0 | 0 | 0 | 0 | ----- | 0 |
| POLY 4 | 0 | 0 | 0 | 0 | 0 | 0 | 0 | 0 | 0 | ----- | 0 |
| ⋮ | ⋮ | ⋮ | ⋮ | ⋮ | ⋮ | ⋮ | ⋮ | ⋮ | ⋮ | | ⋮ |
| POLY MAX | 0 | 0 | 0 | 0 | 0 | 0 | 0 | 0 | 0 | ----- | 1 |

| CAMERA | 0 | 1 | 2 | 3 | 4 | 5 | 6 | 7 | --- MAX |
|---|---|---|---|---|---|---|---|---|---|
| OBJ 0 | 1 | 1 | 1 | 0 | 0 | 0 | 0 | 0 | ------ |
| OBJ 1 | 1 | 0 | 1 | 1 | 0 | 1 | 0 | 0 | ------ |
| OBJ 2 | 0 | 0 | 0 | 1 | 1 | 0 | 1 | 1 | ------ |
| OBJ 3 | 1 | 1 | 0 | 0 | 1 | 1 | 1 | 1 | ------ |
| ⋮ | | | | | | | | | |
| OBJ MAX | | | | | | | | | |

GAME DEVICE, PICTURE DATA AND FLARE FORMING METHOD

BACKGROUND OF THE INVENTION

The present invention relates to a video game device. More particularly, this invention relates to a game device which is installed at amusement centers or at home and which is capable of expressing more realistic pictures.

With the progress of computer technology, video game devices utilizing computer graphics technology have come to be widely used. This type of video game devices are widely accepted by users. A large number of various kinds of game devices have been devised and various game software products which run on such game devices have been supplied.

It is desirable that pictures be displayed in more realistic expressions on a screen so that users would be able to enjoy video games fully. For example, with a vehicle race such as a car race, it is desirable that movements of cars and the background be expressed naturally and that anything which may occur during the drive, for example, reflection of light on a windshield be expressed as special effects on a screen. Moreover, it will be interesting if traces of tire slips of a car appear.

On the other hand, since complicated arithmetic operations such as coordinate transformation are repeated for three-dimensional screen display, the amount of operation borne by CPU becomes enormous. Accordingly, if special effects or the like of picture expressions are performed, the number of polygons to be displayed on the screen must be decreased by the amount of operation to be used for such special effects.

Therefore, it is a first object of this invention to provide a video game device capable of expressing a picture with which a game player can perceive dazzling light from a light source.

It is a second object of this invention to provide a game device capable of expressing, on a screen, traces of a moving object in a video game.

It is a third object of this invention to provide a method of decreasing the amount of operation in a drawing routine when developments of a game in the three-dimensional virtual space are displayed on a two-dimensional screen so that pictures on the screen may seem to be three-dimensional.

SUMMARY OF THE INVENTION

In order to achieve the above-mentioned objects, a game device of the present invention displays a picture of a scene that has come into view by moving a visual point of a virtual camera in a three-dimensional virtual space, and the game device comprises a flare processing means (S102 through S118) for forming a flare in a picture when a light source exists within view. The flare processing means comprises: a line-of-sight vector generating means (S106) for obtaining a line-of-sight vector which shows a line-of-sight direction of the visual point; a ray vector generating means (S104) for obtaining a ray vector which shows a direction of the light source from the visual point; an inner product calculating means (S108) for calculating an inner product of the line-of-sight vector and the ray vector; and a flare forming means (S112 through S118) for forming a flare having intensity according to the inner product in the picture. This makes it possible to form a flare in accordance with the position of the light source from the visual point and/or the intensity of the light source. Expressions are made more closer to real scenes and it is possible to form game pictures with strengthened image effects, thereby making a game more amusing.

The game device of this invention further comprises a determining means (S110) for activating the flare forming means on the basis of the results of comparison of the inner product with a reference value. This makes it possible to prevent lowering of the picture quality by avoiding the formation of flares and performing flare processing when the intensity of the light source is not strong enough to generate flares.

The flare forming means increases a degree of whiteness of the picture in accordance with the inner product (S112). This causes an influence (or flare effect) of the flares upon the picture to be expressed.

The flare forming means forms a picture of flare polygons having transparency according to the inner product (S114, S118). This makes it possible to express flares of a camera lens.

The flare forming means conducts, with the inner product being between a predetermined upper limit and a predetermined lower limit, at least any one of the processing to add whiteness to the picture according to the inner product and the processing to form a flare polygon having transparency according to the inner product. This makes it possible to avoid formation of flares with a light source having weak intensity and to avoid excessive flare processing with a light source having strong intensity.

The flare forming means forms the flare on a straight line linking the visual point with the light source (S116, S118). This makes it possible to express the incidence of rays into a virtual camera.

A game device of this invention is a game device for displaying, as a picture, a scene having come into view by moving a visual point in a three-dimensional virtual space. The game device comprises a flare processing means for forming a flare in the picture when a light source exists within view of the visual point. The flare processing means determines a flare degree in accordance with the likes of a position of the light source within a view and intensity of the light source. In doing so, it is possible to determine the flare degree at an appropriate value by using a table or a function in consideration of the above-mentioned upper limit and lower limit or the like.

The flares are expressed by, for example, displaying on a screen a flat figure having a comparatively higher degree of whiteness than that of the background or a hollow flat figure. Repeating display and no display of the flares in a short period of time, that is, flashing makes it possible to make it look like a real situation of flare formation. Moreover, it is possible to avoid continuous obstruction on a picture of the background by flares (particularly, flare pictures which are not hollow), thereby avoiding interruption with operation of a game.

It is possible to make the flares look like real ones by displaying a plurality of flares on a straight line corresponding to an incident ray. In doing so, it is possible to reduce a burden on arithmetic operation by forming a plurality of flares to be displayed by using similar figures.

The light source is a virtual sun located in the three-dimensional virtual space. The virtual sun is relocated from a normal position to a position within view of a predetermined scene in order to generate the flare in the picture on the predetermined scene. This makes it possible to dramatically present a game scene by intentionally causing the light source to exist in the game scene and by generating flares.

A game device of this invention is a game device for displaying, as a picture, an object moving in accordance with developments of a game. The game device comprises: a means (S132) for reading a present position of the object; and a trace mark drawing means (S132 through S158) for drawing a trace mark in length within a predetermined range from the present position and for extinguishing a bottom position of the trace mark by making it gradually lighter in color with the lapse of time. This makes it possible to reduce the amount of operation for picture processing by reducing trace polygons of, for example, times.

It is preferable that the trace mark consist of plural portions, each portion having an assigned pattern which becomes lighter in color from a top position of the trace mark toward a bottom position of the trace mark. As the trace pattern assigned to each portion, a previously formed pattern can be used. It is possible to change the transparency of a basic trace pattern and use it as a pattern for each portion.

The trace mark drawing means extends only the top position of the trace mark (S142 through S152) when the present position of said object is located less than a predetermined value apart from the top position of the drawn trace mark (S134), and the trace mark drawing means moves, by the predetermined value, the trace mark in its entirety toward the present position of the object (S136 through S158) when the present position of the object is located not less than the predetermined value apart from the top position of the drawn trace mark. This makes it possible to draw the trace mark which will not give a sense of incompatibility to a game player, and to limit the length of the trace mark in its entirety to a constant length and restrain the amount of operation for the picture processing from increasing.

The trace mark drawing means adjusts the timing to extinguish the drawn trace according to a moving speed of the object (S132 through S158).

The trace mark drawing means does not extinguish the drawn trace mark when the object stands still, while the trace mark drawing means extinguishes the drawn trace mark quickly at a speed according to a moving speed of the object when the object is moving (S132 through S158). This allows the trace mark to follow the movements of the object.

Moreover, it is preferable that the trace mark drawing means delete the drawn trace mark when the object stops and a predetermined amount of time has passed. This makes it possible to reduce the number of display polygons (or slip traces) and to lessen a burden on the operation of the CPU.

The trace mark drawing means has: a cyclic register (as shown in FIG. 10) for retaining positions of respective portions of a mark, which consists of the plural portions (as shown in FIG. 9), in a plurality of storage regions which respectively correspond to the respective portions of the mark; and a mark top position indicating means (as shown in FIGS. 6 and 8) for indicating a storage region of the cyclic register, which corresponds to the top position of a mark.

A medium of this invention stores a program for making a computer system function as a game device as described above.

A method of forming picture data of this invention comprises the steps of: locating an object composed of polygons in a three-dimensional virtual space (S202); setting a visual point in the three-dimensional virtual space and forming a projected picture by projecting polygons in a display region as seen from this visual point on a plane of projection (S254); identifying whether each polygon is visible or invisible from the visual point according to the projected picture formed on the plane of projection (S256); forming object data from data showing whether each polygon is visible or invisible (S212); and relating the visual point with the object data (S216).

A method of forming picture data of this invention comprises the steps of: locating all objects composed of polygons in a three-dimensional space (S202); setting a plurality of visual points in the three-dimensional space (S204); forming a projected picture for each visual point by projecting, on a plane of projection for each visual point, the polygons within a display region as seen from each visual point (S252, S254); identifying whether each polygon is visible or invisible from each visual point according to the projected picture formed on the plane of projection (S256); forming data showing whether each polygon is visible or invisible from each visual point on the basis of the results of the identification (S258); forming a plurality of object data by making the same or similar patterns into a group in accordance with a data pattern of each polygon, the data representing whether the polygon is visible or invisible from each visual point (S212); and forming an object table representing object data which can be seen from each visual point (S216).

A medium of this invention stores a program for having a computer system execute each step of the above-described method of forming picture data.

BRIEF DESCRIPTION OF THE DRAWINGS

FIGS. 7(a) and 7(b) describe examples in which a flare degree is found by referring to a table.

FIG. 10 describes the content of RAM.

FIG. 21 is a table showing whether the polygons are visible or invisible.

FIG. 23 explains a transformation table according to which objects to be drawn are selected according to the camera ID.

DETAILED DESCRIPTION OF THE INVENTION

The construction of a game device capable of executing an algorithm concerning pictures of special effects according to this invention is hereinafter explained with reference to drawings.

Figure 1:
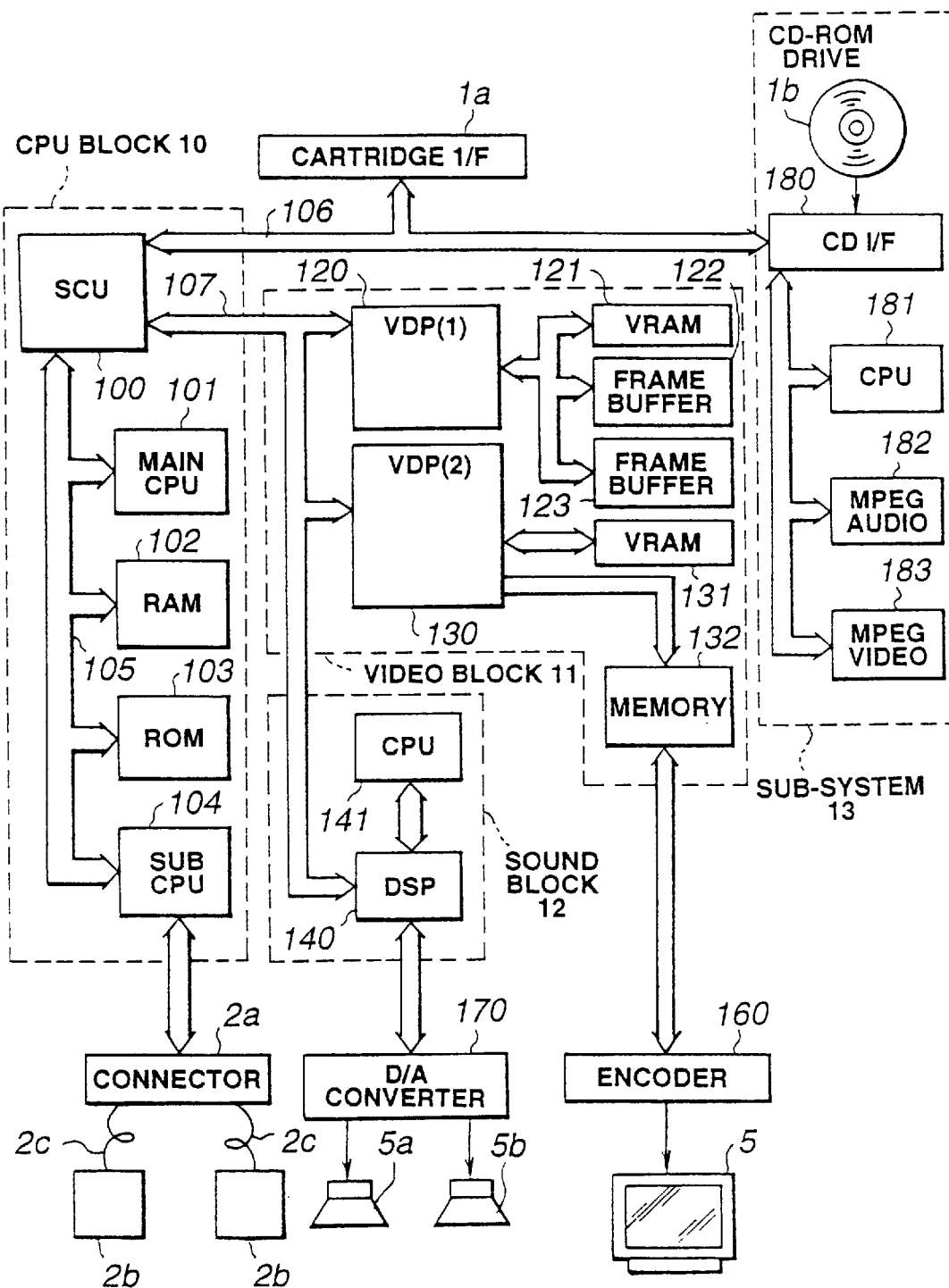
FIG. 1 is a functional block diagram of a game device according to an embodiment of the present invention.

FIG. 1 is a block diagram showing the outline of a video game device. This device is composed of: a CPU block 10 for controlling the device in its entirety; a video block 11 for controlling the display of a game screen; a sound block 12 for generating effect sound or the like; a subsystem 13 for reading a CD-ROM; and other elements.

The CPU block 10 is composed of an SCU (System Control Unit) 100, a main CPU 101, a RAM 102, a ROM 103, a cartridge I/F 1a, a sub-CPU 104, a CPU bus 103 and other elements. The main CPU 101 controls the device in its entirety. This main CPU 101 comprises the same operating function inside as that of a DSP (Digital Signal Processor) and is capable of executing application software at a high speed.

The RAM 102 is used as a work area for the main CPU 101. the ROM 103 has, for example, an initial program for initialization written thereon. The SCU 100 is designed to perform smooth input and output of data between, for example, the main CPU 101, a VDP 120 and 130, a DSP 140, and a CPU 141. The SCU 100 comprises a DMA controller inside and is capable of transmitting object (or sprite) data during a game to a VRAM within the video block 11. This makes it possible to execute application software of, for example, a game at a high speed. The cartridge I/F is designed to input application software which is supplied in a ROM cartridge form.

The sub-CPU 104 is called an SMPC (System Manager & Peripheral Control) and is provided with, for example, a function to collect peripheral data from an input device 2b through a connector 2a upon request of the main CPU 101. The main CPU 101 conducts processing to move, for example, a car (or object) on a game screen on the basis of the peripheral data received from the sub-CPU 104. An operating unit, which comprises a handle, an accelerator and a break, is connected to the connector 2a. It is also possible to connect optional peripherals such as a pad, a joystick or a keyboard to the connector 2a. Connecting two operating units 2b to the connector 2a makes it possible to perform a car race for plural game players. The sub-CPU 104 is provided with a function to automatically recognize the type of peripheral connected to the connector 2a (at a terminal on the main frame side) and to collect peripheral data or the like in a communication format in accordance with the type of peripheral.

The video block 11 comprises: a VDP (Video Display Processor) 120 which mainly performs drawing of, for example, objects composed of polygon data in a video game; and a VDP 130 which mainly performs drawing of background pictures, synthesis of polygon picture data (of objects) with the background pictures, and clipping processing.

The VDP 120 is connected to a VRAM 121 and a plurality of frame buffers (two buffers 122 and 123 are shown in FIG. 1). A command to draw polygons which represent objects for a video game device is sent from the main CPU 101 to the SCU 100 and then to the VDP 120 and is then written on the VRAM 121. The VDP 120 reads the drawing command from the VRAM into a system register inside and writes drawing data into the frame buffer. Drawing data of the frame buffer 122 or 123 is sent to the VDP 130. The VDP 120 is provided with, for example, the functions of: texture parts display to display objects in fixed forms, expanded or contracted objects, deformed objects or the like; formless objects display to display quadrilateral polygons, polylines, lines or the like; color operations such as semitransparent operation between parts, semiluminance operation, shadow operation, graduation operation, mesh operation or shading operation; mesh processing; and operation to perform clipping in order to avoid drawing in regions other than the display region which has been set. The VDP 120 also comprises a geometrizer which performs matrix operations and is capable of quickly performing operations such as expansion, contraction, rotation, deformation or coordinate transformation.

The VDP 130 is connected to a VRAM 131 and it is constructed in a manner such that picture data outputted from the VDP 130 is outputted to an encoder 160 through a memory 132. In addition to the functions that the VDP 120 has, the VDP 130 is provided with, for example, a scrolling function to control a scroll picture display and a priority function to determine the priority order to display objects and pictures.

The encoder 160 adds synchronization signals or the like to the picture data, thereby generating video signals which are then outputted to a TV picture receiver 5 (or projector). Accordingly, pictures of various kinds of games are displayed on the TV picture receiver 5.

The sound block 12 is composed of a DSP 140 for synthesizing sound in the PCM format or the FM format, and the CPU 141 for, for example, controlling the DSP 140. Sound data generated by the DSP 140 are converted into two-channel signals by a D/A converter 170, which are then outputted to a speaker 5b.

The subsystem 13 is composed of a CD-ROM drive 1b, a CD I/F 180, a CPU 181, an MPEG AUDIO 182, an MPEG VIDEO 183 and other elements. This subsystem 13 has functions, for example, to read application software supplied in the CD-ROM form and to reproduce animation. The CD-ROM drive 1b is designed to read data from a CD-ROM. The CPU 181 performs processing such as control of the CD-ROM drive 1b and correction of errors in the read data. The data read from a CD-ROM are supplied to the main CPU 101 through the CD I/F 180, a bus 106 and the SCU 100 and are utilized as application software. The MPEG AUDIO 182 and the MPEG VIDEO 183 are devices for restoring data which are compressed in the MPEG (motion Picture Expert Group) standards. Restoration of the MPEG compressed data, which are written on a CD-ROM, by using these MPEG AUDIO 182 and MPEG AUDIO 183 makes it possible to reproduce animation.

A first embodiment of special effects in pictures of this invention is hereinafter explained with reference to FIGS. 2, 3 and 4.

In this embodiment, when a ray enters a so-called virtual camera from a light source in course of developments of a game, flares from the ray are generated in pictures, thereby providing more realistic pictures. FIG. 2 is a flowchart which explains an algorithm of flare formation. FIG. 3 explains how conditions on the flare formation are determined. FIG. 4 shows an example of a picture in which flares are generated.

The CPU 101 develops a car race game in a three-dimensional virtual space in accordance with a main game program and data of driving operation (not shown). The main game program and data are supplied by means of an information storage medium such as a ROM cartridge, CD-ROM or floppy disk, and are previously loaded on the memory. Moreover, the program and data may be downloaded through the medium of communication networks such as the Internet, personal computer communication or satellite communication, or broadcasting. The CPU 101 locates objects such as cars and background in the three-dimensional virtual space and controls positions, movements or the like of the objects in synchronization with frame cycles of the TV picture receiver.

Figure 3:
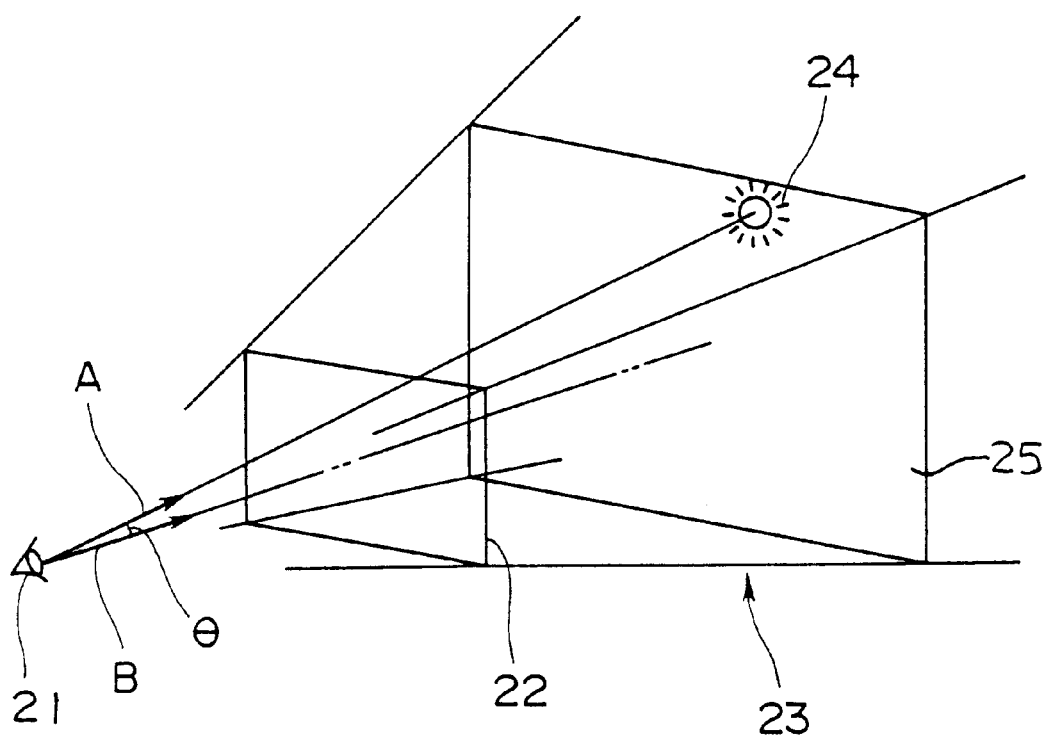
FIG. 3 describes conditions of flare generation.

FIG. 3 shows a situation where the three-dimensional virtual space is observed from a virtual camera which corresponds to a visual point of a game or driver. In FIG. 3, the reference numeral 21 is a virtual camera (or a visual point), the reference numeral 22 is a plane of projection which corresponds to a screen of a television monitor, the reference numeral 23 is the three-dimensional virtual space where a game is developed, the reference numeral 24 is a virtual light source located in the three-dimensional virtual space, and the reference numeral 25 is a range of view of the virtual camera. The letter "A" indicates a unit vector on a line linking a camera position and the light source. The letter "B" indicates a unit vector existing in a facing direction of the virtual camera. The letter "θ" is an angle formed by the vectors A and B. However, as described below, the vector is not limited to the unit vector.

The CPU 101 determines whether or not a light source polygon 24 of the sun, street lights or the like is within view (or a screen) 25 of the virtual camera during the execution of the main game program (S102). Objects to be located in the virtual space for each scene are previously made into the data bases and, therefore, it is possible to acknowledge the existence of the light source object according to the individual number of objects listed up for the relevant scene.

If the light source object does not exist within view, flares are not generated and this picture processing is terminated.

If the light source object exists, the CPU 101 determines to what extent the camera is facing in the direction of the light source or in what position relationship the light source is located within view in order to determine, for example, whether or not rays from the light source may enter the camera lens or the degree of influence of incident light. For this purpose, a segment linking the camera position with the light source object in the three-dimensional virtual space is found and then the vector A in unit length is obtained (S104). A facing direction of the camera 21 in the three-dimensional virtual space on this scene is found from the data base and then the unit vector B which represents the facing direction of the camera is obtained (S106). An inner product C of the unit vectors A and B, that is, $C = |A| \cdot |B| \cos \theta$ is calculated. If the directions of both unit vectors A and B coincide with each other, θ is 0 degrees and the inner product is 1. On the contrary, as the directions of both vectors become wider apart, the inner product becomes closer to 0 (S108). In order to reflect the intensity of the light source on the inner product C, the value of the vector A is set as not the unit length "1," but a value corresponding to the intensity of the light source. In this case, the vector A corresponds to an incident light having a direction and size (or strength of light).

The CPU 101 compares the inner product with a reference value which is previously determined as a condition of flare generation. It determines whether or not the inner product C exceeds the reference value or threshold value) (S110). If the inner product C does not exceed the reference value, flares are not generated or it is determined that the circumstances do not require the generation of flares. Accordingly, this picture processing is terminated and returns to the main program. The flare processing should be performed to the extent that a game player can recognize that a picture is influenced by the light source. Otherwise, the flare processing (for example, a fog effect as described below) may cause a kind of deterioration of picture quality. Such deterioration of picture quality can be avoided by the above-described determination (S110).

If the inner product C exceeds the reference value, the CPU 101 performs the flare processing. As the value C of the inner product is larger, it means that a ray comes straight from the light source and enters the camera lens, thereby stronger flares are generated. Accordingly, whiteness is added to a picture in proportion to the value C, thereby causing a so-called "fog effect." This can be realized by changing luminance and chromaticity parameters for color operations of the VDP 120 and 130 (S112). Subsequently, a transparency D in proportion to the value C is found (S114). A line linking the camera position with the light source object is converted into a line E on a two-dimensional screen and a route of the ray in a screen picture is specified (S116). Flare polygons having the transparency D are drawn at appropriate positions along the line E. For example, if the transparency D is semitransparent, half of the luminance of a ground picture is added to half of the luminance of the flare polygons, and the results of addition are drawn on the frame buffer, thereby obtaining a flare picture (S118). If a plurality of light source polygons which have a large quantity of light exist within view, the above-described flare generation processing is performed for each polygon.

Only one of the fog effect and the flare polygon processing may be performed. If the light source exists within view (S102: Yes), the light source exerts some influence. The degree of influence is controlled by the inner product C. Accordingly, it is not indispensable to set a threshold value (S110). For example, if the light source exists within view, the transparency of the flare polygons may be adjusted according to the inner product C. In addition, once the inner product C exceeds the threshold value, the fog effect may be caused in proportion to the inner product C. Moreover, it is possible to adjust the whiteness and transparency of the picture by considering the type of the light source such as the sun or street light, and the intensity of the light source.

Figure 4:
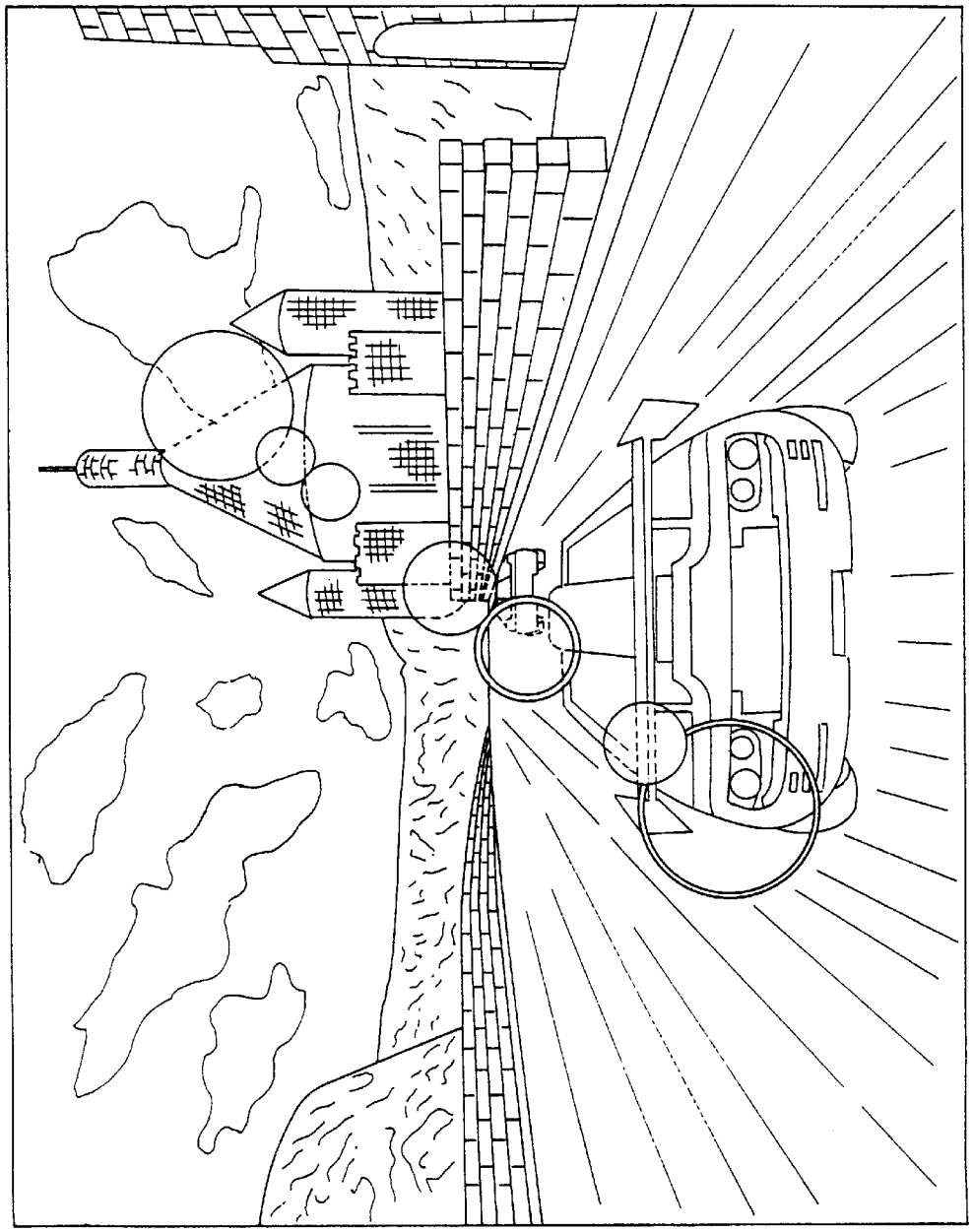
FIG. 4 shows an example of a flare generated screen.

FIG. 4 shows a situation where flares are generated in a picture during a race. In this example, the light source object exists on the upper right side of the screen the ring-shaped flare polygons and circle-shaped flare polygons are displayed along the line E (not shown). The shape of the flare polygons is not limited to generally circular contours as shown in FIG. 4. For example, the flare polygons may have polygonal contours. Other than the semitransparent processing of the flare polygons, the flare polygons which have been previously formed may be displayed as they are without performing the semitransparent processing. If such flare polygons are displayed in the expression form of flashing by repeatedly displaying and extinguishing the flare polygons, the backside of the flare polygons can be seen intermittently. Accordingly, the same effect can be obtained as in the case where a figure with its inside not extinct, that is, the figure which is not hollow or annular is made into a figure without its inside, or as in the case where the flare polygons are made semitransparent. Therefore, the background can be seen and the operations of a game will not be obstructed. It is also possible to make the flare polygons look like real flares.

Display of flares is not limited to the display of the flare polygons. Flat figures representing flares may be used to perform picture synthesis. In the case of flare flashing as described above, it is possible to use flares formed with flat figures (or preferably hollow figures, or generally circular or polygonal figures corresponding to lens flares) which are tinted color with higher whiteness than the background because of the fog effect, to perform the picture synthesis, and to display a plurality of figures similar to such flat figures on a line which corresponds to an incident light and which links the visual point with the light source. In this case, a burden on operations is comparatively small.

Figure 5:
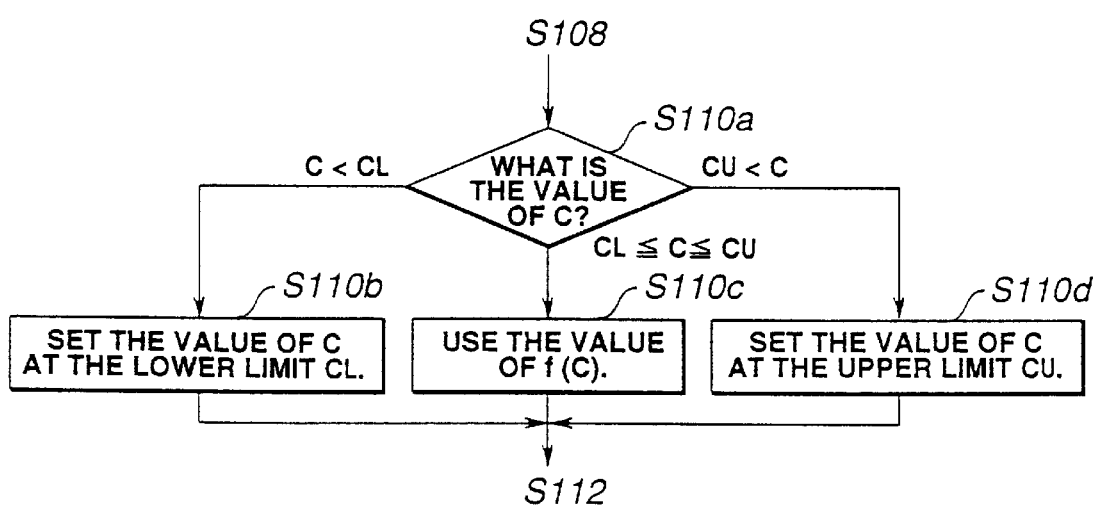
FIG. 5 is a flowchart which explains another algorithm of flare formation.
Figure 6:
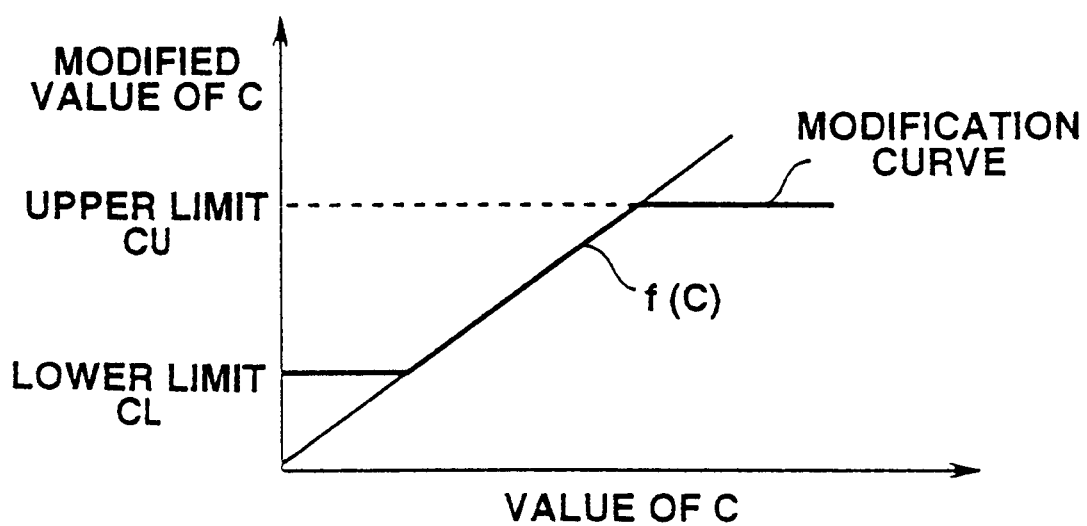
FIG. 6 is a graph which explains the algorithm shown in FIG. 5.

FIGS. 5 and 6 show another embodiment of the flare processing. In this example, Step S110 of the flowchart shown in FIG. 2 is modified. As shown in FIG. 6, an upper limit CU and a lower limit CL are set in using the value C of the inner product. If the inner product C exceeds the upper limit CU (S110a: CU<C), the inner product is set at the value CU (S110d). This makes it possible to prevent a picture from becoming too white because of the flares. If the inner product C is less than the lower limit (S110a: C<CL), the inner product C is set at the value CL (S110b) in order to produce a constant flare effect. Moreover, if the inner product C is between the upper limit CU and the lower limit CL (S100a: CL≦C≦CU), a modification function f(C) is used to obtain a modified value C'=f(C). As described above, it is possible to perform the flare processing more effectively by modifying the inner product as appropriate.

Figure 2:
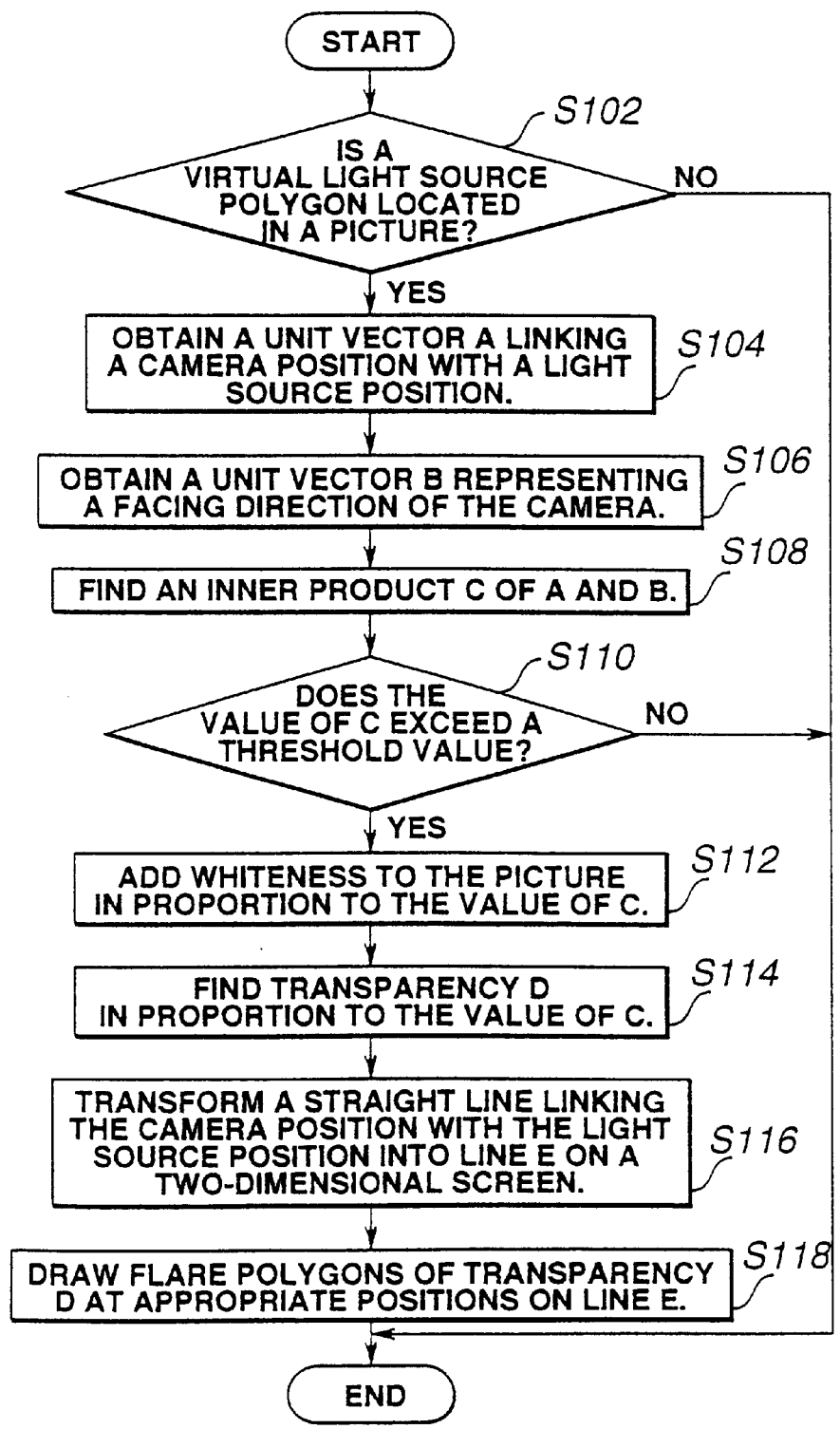
FIG. 2 is a flowchart which explains an algorithm of flare formation.

In the example as shown in FIG. 2, the inner product C is utilized to determine the flare degree. However, it is possible to perform similar processing without necessarily calculating the inner product C.

FIGS. 7(a) and 7(b) show two examples in which the flare degree is determined by referring to tables. The flare degree is also represented as C for convenience.

If a virtual light source exists on the screen at the aforementioned step S102 (S102: Yes), the flare value C corresponding to a position of the virtual light source (for example, an angle θ formed by the vector A and the vector B) can be decided by referring to a table shown in FIG. 7(a). The position of the virtual light source may have a coordinate value (x, y) on the screen or within view 25. It is possible to previously store such a table on a CD-ROM 1b as a data base and to read it when starting a game and retain it on the RAM 102.

Moreover, it is possible to obtain a flare value Cnn corresponding to a position of the light source θn and intensity Pn by referring to a table for finding the intensity of flares corresponding to the intensity of the light source. Although not specifically shown in the drawing, if the flare degree is determined in accordance with the intensity of the light source, the table which retains the flare value C which conforms only to the intensity of the light source may be used. The flare value C so obtained can be used in the same manner as the inner product C at and after step S100. It is also possible to perform the same flare processing. If the flare degree is determined by referring to a table, anything (such as morning, evening, rain, fog, or existence of clouds) can be included as parameters in addition to the position and intensity of the light source as described above. The content of the table is not limited to what is shown in FIGS. 7(a) or 7(b).

Instead of the above-described table, functions which serve similarly to the table, such as C=g(θ, P), C=h(θ), C=i(P) or C=j(x, y), may be used.

An explanation is hereinafter given concerning the case where flares are utilized. A position of the virtual sun in a so-called world coordinate system is originally settled. However, in order to make it easy to play a race game, it is possible to move the position of the virtual sun as appropriate so that backlight will not be generated. On the contrary, in order to enhance the stage effect of a game, it is possible to place the virtual sun where the virtual sun originally does not exist and intentionally create a backlight situation, thereby causing flares.

Figure 8:
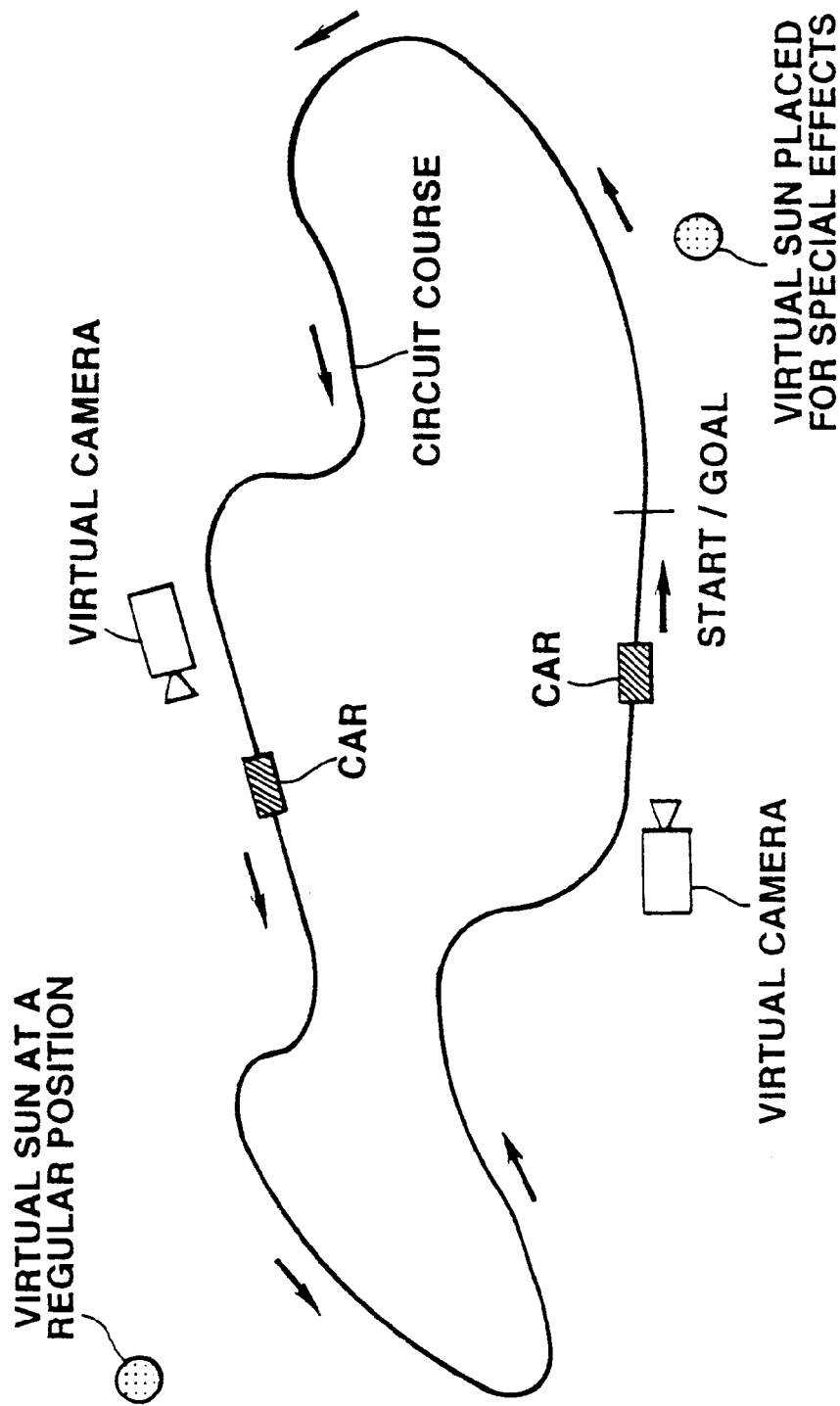
FIG. 8 describes an example in which a flare is intentionally generated by moving a light source.

For example, as shown in FIG. 8, it is possible to produce the climax of a game by intentionally moving the virtual sun from the regular position of the virtual sun to a position to come into view after a goal and by generating flares in pictures after the goal.

An algorithm of a second special effects picture is hereinafter explained with reference to FIGS. 9 through 14. This algorithm is to express car spinning, tire slips, driving on a bad road, etc. more realistically by leaving traces of ties on a road. Moreover, the amount of operations for the picture processing is decreased by reducing polygons (or traces of tires) on the screen by deleting the traces of tires after a certain amount of time has elapsed. Since the traces of tires themselves are not necessary as driving information for a game, the traces are gradually deleted from their bottoms in a natural manner so that the amount of information will not become excessive.

Figure 9:
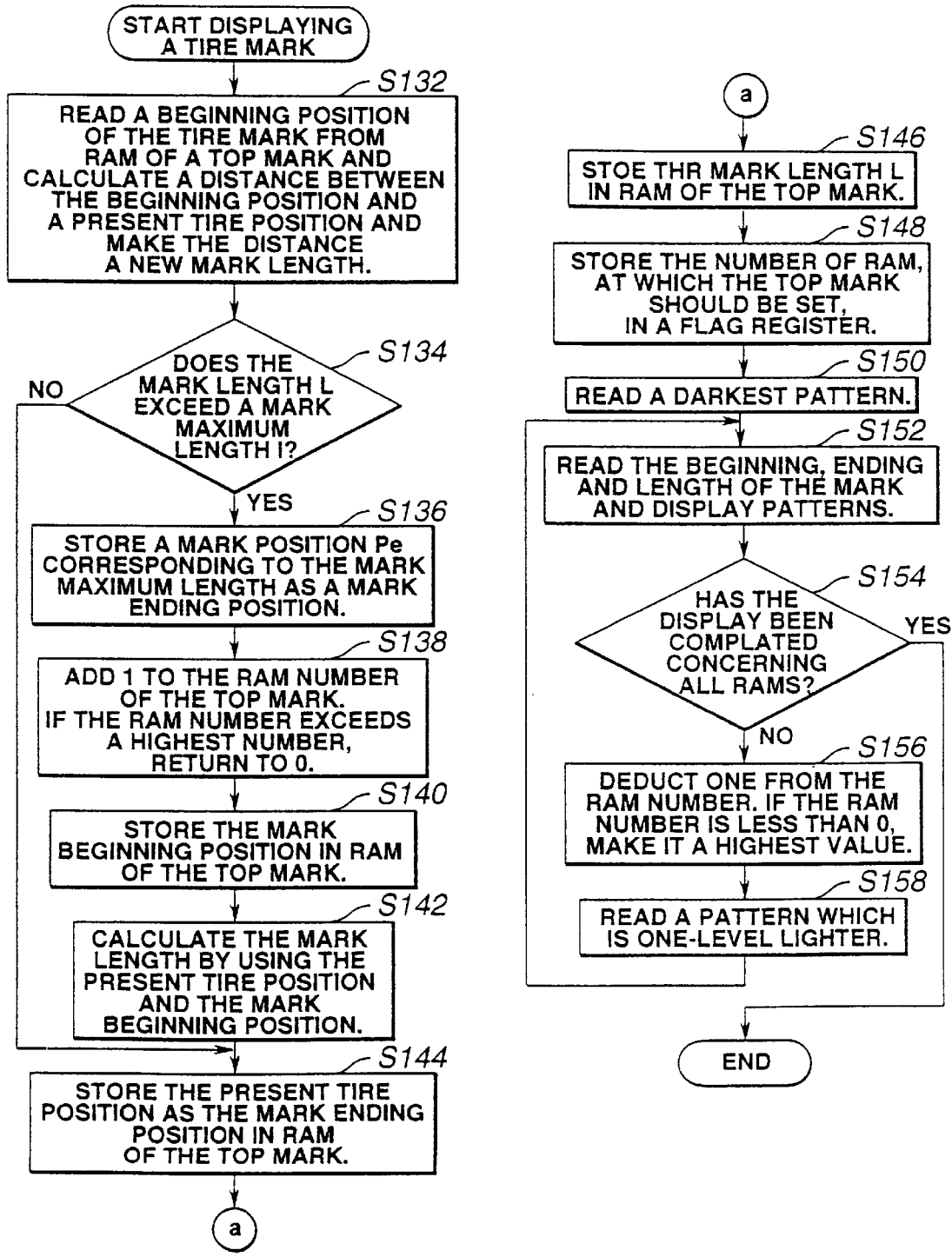
FIG. 9 is a flowchart which describes an algorithm to display a tire mark.

FIG. 9 is a flowchart which explains an algorithm to display tire traces (or tire marks). FIGS. 10 through 13 explain reading of data, display of the tire marks, etc. FIG. 14 shows an example where the tire marks are drawn.

In this embodiment, for example, five kinds of tire marks concerning which density becomes gradually higher, that is, patterns 0 through 4 are used to express the tire traces realistically. Each pattern is stored in a data base (ROM). Five storage regions of the RAM or registers as shown in FIG. 10 are used in order to cause the tire traces to follow the movements of car tires and to gradually extinguish the traces.

At first, the main program determines whether or not display conditions of the tire marks are satisfied. In other words, a tire mark display routine is executed by determining, for example, whether or not tire slips have occurred due to spinning of a car or abrupt pressing on the accelerator or whether or not a car is running on a bad road by referring to the relevant functions or flags which indicate driving conditions.

Once a tire slip starts, the CPU 101 reads a previous tire position $X_{n-1}$ from, among five RAMs, a top mark RAM at which a top mark flag representing a top position of a tire mark is set, and calculates a distance $L(=T_{xn}-X_{n-1})$ between the previous tire position and a present tire position $T_{xn}$ displayed on the screen, thereby making a new mark length L (S132). The position $X_{n-1}$ and the position $T_{xn}$ herein used mean coordinate values in the three-dimensional virtual space. The CPU 101 determines whether or not the tire mark length L exceeds a maximum length l of a basic pattern of the tire mark (S134).

If the tire mark length L does not exceed the maximum length l (S134: No), the CPU 101 causes the top mark RAM to store the present tire position $T_{xn}$ as an ending position of the tire mark (S144). The tire mark length L is stored in the top mark RAM (S146). The CPU 101 causes the number of the top mark RAM to be retained as it is without updating the content of the flag register for storing the number of the RAM at which the top mark flag should be set (S148).

Figure 13:
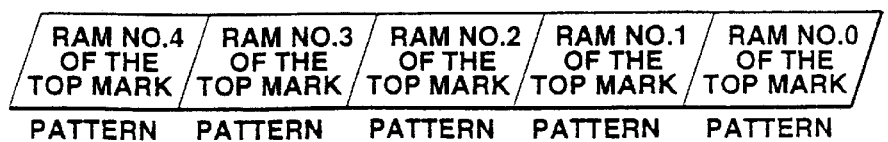
FIG. 13 describes a correspondence relationship between the RAM number and the tire mark patterns.
Figure 14:
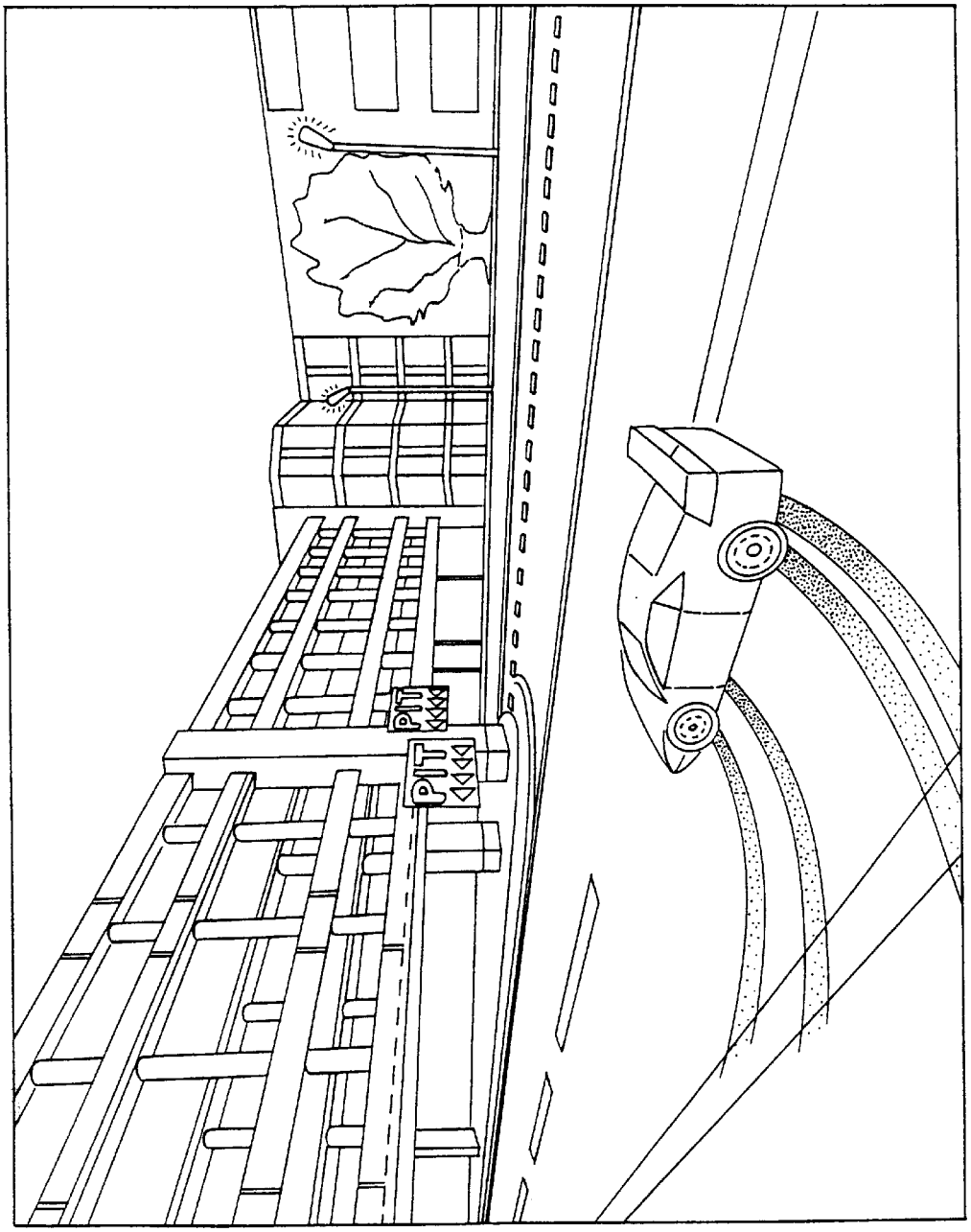
FIG. 14 shows a picture in which slip marks are drawn.

The RAM number is matched with the patterns as shown in FIG. 13. Data is read from the top mark RAM in a cyclic manner, thereby drawing the tire mark. In other words, the top mark RAM No. 0 is matched with the pattern 4, the top mark RAM No. 1 is matched with the pattern 3, the top mark RAM No. 2 is matched with the pattern 2, the top mark RAM No. 3 is matched with the pattern 1 and the top mark RAM No. 4 is matched with the pattern 0. As the pattern changes from pattern 0 to pattern 4, density of the tire mark changes from a light color to a dark color. The number of the top mark RAM represents a newest tire trace in terms of time.

The CPU 101 reads out the darkest pattern (pattern 4) (S150). It reads a tire mark beginning position $X_{n-1}$, a tire mark ending position $T_{xn}$ and a length L from the RAM and displays the patterns on the screen (S152). It determines whether or not display of all the patterns for the number of RAMs has been completed (S154).

If the tire mark beginning, ending and length are stored in a plurality of RAMs by the preceding tire mark processing (S154: No), the CPU 101 designates that the RAM number be checked in a cyclic manner in the downstream order (S156), and reads the tire mark patterns which become lighter in color step by step or gradually in the downstream order in accordance with the RAM number (S158). When display of the patterns for the number of RAMs have been finished (S154: Yes), the CPU 101 once returns to the main program.

While the tire mark display conditions are satisfied and until the tire mark length L exceeds the maximum tire mark length l, steps S132, S134, S144 through S154 are repeated and the tire marks are drawn in a manner such that the darkest pattern immediately follows the tire.

If the mark length L exceeds the maximum mark length l (S134: Yes), a mark position $Pe(=X_{n-1}+l)$ corresponding to the maximum mark length l is stored as the mark ending position (S136). The number of the top mark RAM is increased by one. If the RAM number exceeds a maximum value ("4" in this case), the RAM number returns to zero (S138). The mark beginning position Pe is stored in a new top mark RAM (S140). The present tire position $T_{xn}$ and the tire mark beginning position Pe are used to find the tire mark length $L(=T_{xn}-Pe)$ by calculation (S142). The present tire position $T_{xn}$ is stored as the mark ending position in the top mark RAM (S144). The tire mark length L is stored in the top mark RAM (S146). The RAM number to be stored in the flag register is set at the number of the top mark RAM updated at S138 (S148). The darkest pattern (pattern 4) is read out (S150). The tire mark beginning position Pe, ending position $T_{xn}$ and length L are read from the RAM and the patterns are displayed on the screen (S152). It is determined whether or not display of all the patterns for the number of RAMs have been finished (S154).

If the tire mark beginning, ending and length are stored in a plurality of RAMs by the preceding tire mark processing (S154: No), the CPU 101 designates that the RAM number be checked in a cyclic manner in the downstream order (S156), and reads the tire mark patterns which become lighter in color step by step or gradually in the downstream order in accordance with the RAM number (S158).

The above-described tire mark drawing processing is executed and the tire marks are drawn on the screen while the tire mark display conditions are satisfied upon the execution of the main program.

An explanation is hereinafter given with reference to FIGS. 10(a) through 10(e) about data retained in RAM0 through RAM4 and updating of the retained data in the flag register by means of the above-described algorithm.

FIG. 10(a) explains the case where the length L of the tire mark caused by a slip is Δl, that is, less than the mark reference value l (S134: No).

If the top mark indicates RAM0, the tire mark beginning position X0 and the present position $T_{x1}$ are read in at step S132 and the length $L=\Delta l$ $(=T_{x1}-X_0)$ is calculated. The initial tire mark beginning position $X_0$ is the tire position when a slip starts. These values are stored in RAM0 (S144 through S146). RAM0 is made the number of the top mark RAM to be retained in the flag register (S148). As shown in FIG. 13, the number of the top mark RAM corresponds to the darkest pattern 4. The beginning, ending and length of the tire mark are read from RAM0 and the tire mark is drawn according to the pattern 4 (S152). In this case, there is one RAM in which data are written (S154: Yes), this routine is terminated to return to the main program. If the tire mark display conditions are satisfied, until the mark length L exceeds the maximum length l, the above-described processing is repeated and the tire mark of the pattern 4 is extended.

As shown in FIG. 10(b), the present tire position becomes $T_{x2}$ and the length $L(=T_{x2}-X_0=l+\Delta l)$ exceeds the maximum mark length l (S134: Yes). $X_1=X_0+l$ $(=Pe)$ is found and the position $X_1$ is stored as the mark ending position in RAM0 (S136). The top mark RAM is made RAM1 (S138). The present tire position $T_{x2}$ and the mark beginning position $X_1$ are used to calculate the mark length L $(=\Delta l=T_{x2}-X_1)$ (S142). The present tire position $T_{x2}$ is made the mark ending position and is stored in RAM1 (S144). The mark length L $(=\Delta l=T_{x2}-X_1)$ is stored in RAM1. The number of the top mark RAM to be retained in the flag register and to be read out in a cyclic manner is set as RAM1 (S148). Data of the pattern 4 is made to correspond to RAM1 (S150). The dark tire mark of the pattern 4 is drawn according to the data of RAM1 (S152). Moreover, the tire mark of the pattern 3 is drawn according to the data stored in RAM0 (S154, S156, S158 and S152). Then the CPU returns to the main program.

As shown in FIGS. 10(c) through 10(e), by repeating the above-described processing in the same way, drawing data of the tire mark (the beginning, ending and length of the tire mark) are retained in RAM0 through RAM4.

Figure 11:
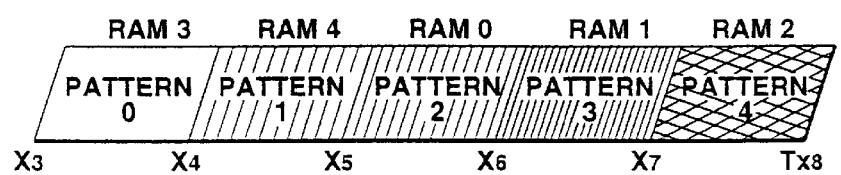
FIG. 11 describes the state of RAM when one round of writing has been finished.
Figure 12:
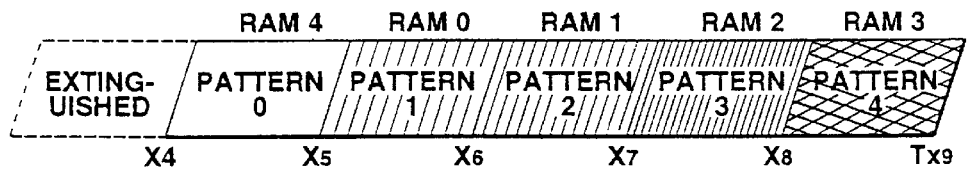
FIG. 12 describes tire marks drawn by RAM as shown in FIG. 11.

FIG. 11 shows an example where on round of data preservation onto RAM0 through RAM4 have been completed. Since there are five RAMs in this embodiment, rewriting is conducted in serial order. FIG. 11(a) shows a situation where one round of rewriting is completed and the top position of the tire mark corresponds to RAM2. FIG. 11(b) shows a situation where on round of rewriting is completed and the top position is located at RAM3. Since the previous data portion of the tire mark which has been rewritten is not displayed, the relevant pattern drawn on the screen is extinguished. If the position coordinate $X_n$ is located out of view of the virtual camera, such a position will be regarded as being not subject to the picture processing and, therefore, will not be displayed by means of clipping.

FIG. 12(a) explains the case where the data shown in FIG. 11(a) is drawn as a tire mark. The pattern 4 is drawn in a pattern length of Δl and each of the patterns 3, 2, 1 and 0 is drawn in a pattern length of l. Drawing density becomes lighter from the pattern 4 to the pattern 0. FIG. 12(b) shows a tire mark drawn by using the data shown in FIG. 11(b). A drawing range of the tire mark has moved from the position $X_3$ through $T_{x8}$ of FIG. 12(a) to the position $X_4$ through $T_{x9}$, following the tire object of a car. The tire mark of the position range $X_3$ through $X_4$ has been extinguished. This limits the tire trace to a predetermined length and prevents the amount of operations necessary to display the tire mark from increasing too much.

According to the algorithm explained with reference to the flowchart of FIG. 9, when a car stands still, the position information in RAM0 through RAM4 is retained and, therefore, the tire mark is being displayed on the screen. On the other hand, when the car is moving, the tire mark is drawn, following the tire. This tire mark becomes lighter in color at its bottom. If a moving speed of the car is fast, a travel amount L of tires from the position where sampling was performed the last time exceeds the maximum mark length l in a short period of time. This causes the position information in RAM0 through RAM4 to shift and the bottom of the tire mark is quickly extinguished. As a result, the timing to extinguish the drawn tire traces is adjusted in accordance with the moving speed of the car. Such a method of drawing pictures makes is possible to save memory consumption, compared to a conventional method of preparing various pictures with tire traces drawn in advance (which requires an enormous amount of memory) and of selecting an appropriate picture out of such pictures. A racing car moves at a high speed. In such a situation, if it is set to quickly extinguish the tire marks on a course, the number of polygons of a game player's car and opponent cars within view can be reduced and a burden on the operational processing for picture drawing can be lessened. If the tire marks continue to be displayed indefinitely, it will interfere with the game. However, there is no fear of such interference regarding the present application because the tire marks are extinguished at an appropriate time.

In the above-described example, a plurality of tire trace patterns (or polygons of traces) of different density are prepared in advance (FIG. 13) and appropriate trace patterns are selected to draw the entire traces. However, it is possible to adopt other methods. For example, at the step of drawing a tire mark which gradually becomes lighter in color (step S158), a trace mark of predetermined density may be obtained by performing the processing to make the darkest tire trace mark (which is a basic pattern) semitransparent. Specifically speaking, transparency for the transparency processing at the above-mentioned step is selected from a plurality of transparencies which are set by steps according to the number of execution of the routine (S152 through S158). Respective trace marks which have undergone the semitransparent processing with different transparencies are combined to form the entire trace. This method gives rise to the same results as those in the aforementioned case where a plurality of tire trace patters of different density are prepared to form the entire trace of density gradually changing from the top to the bottom. Furthermore, concerning the trace mark consisting of a plurality of polygons, which is displayed according to the routine as shown in FIG. 9, the polygons are made gradually lighter in color by means of the semitransparent processing and are then extinguished in the order first displayed (the size of polygons does not change at the step of making them lighter), and when the polygons become no longer visible in the end, such polygons themselves are removed out of the object of the processing (step S154, FIG. 12(b)).

FIG. 14 shows an example where a car spins and tire marks (or slip traces) are drawn on the screen. A portion of the marks closer to the tires are drawn in dark color and the beginning positions of the tire marks are drawn in light color.

When a tire slip occurs due to, for example, a spin of a car (or object), if tire slip traces are displayed immediately after the slip, a game player will perceive the realistic expression. However, if a certain amount of time has passed from the occurrence of the slip, the game player's attention to the slip traces will decrease. Accordingly, after the car stops moving and a predetermined amount of time has elapsed, it may be decided to extinguish the slip traces actively. This makes it possible to reduce the number of display polygons (or slip traces) and to lessen the burden on operations of the CPU.

In the above-described embodiment, an explanation has been give with regard to the tire marks. However, this embodiment can be also applied to, for example, running traces of a car running on a bad road in a rally, running traces of skis (or track of skis in the snow), traces of jet skis, or wakes behind a ship.

An explanation is hereinafter given about a reduction in the amount of operations with a video game device. Concerning objects to be projected on a monitor by means of so-called three-dimensional graphics, the arithmetic processing is performed such as placement of the objects into the three-dimensional virtual space, projection transformation for drawing the objects on a plane of projection, modeling transformation, and viewing transformation, thereby forming monitor pictures. Upon perspective transformation, a clipping is performed by forming a view pyramid and by removing and not displaying the portions outside the display region to be actually projected on the plane of projection. This clipping contributes to a reduction of the amount of operations.

Another embodiment of this invention performs the clipping even in the display region and is intended to further reduce the amount of operations.

Figure 15:
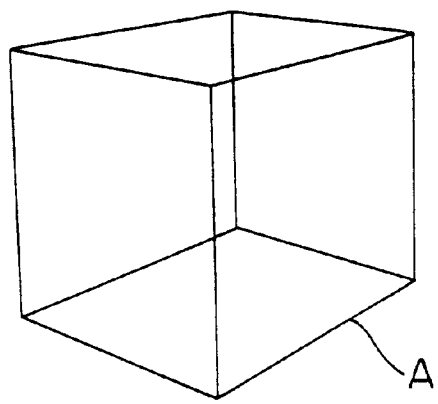
FIG. 15 shows an example of objects located in a three-dimensional virtual space.
Figure 15:
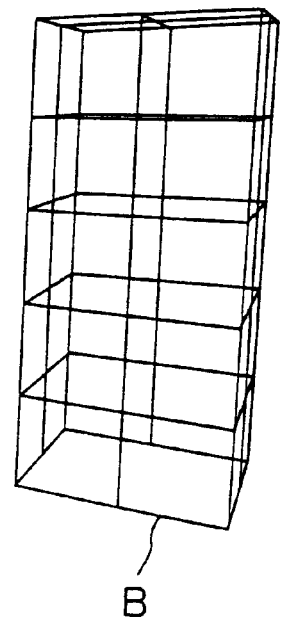

The outline of such an embodiment is explained with reference to FIGS. 15 through 17. FIG. 15 shows objects A and B located in the three-dimensional virtual space. Objects A and B are respectively composed of a plurality of polygons. As in conventional cases, objects in the display regions are read from a data base and are located in the original shape at relevant positions. Textures (or patterns) are pasted on the surface of polygons.

Figure 16:
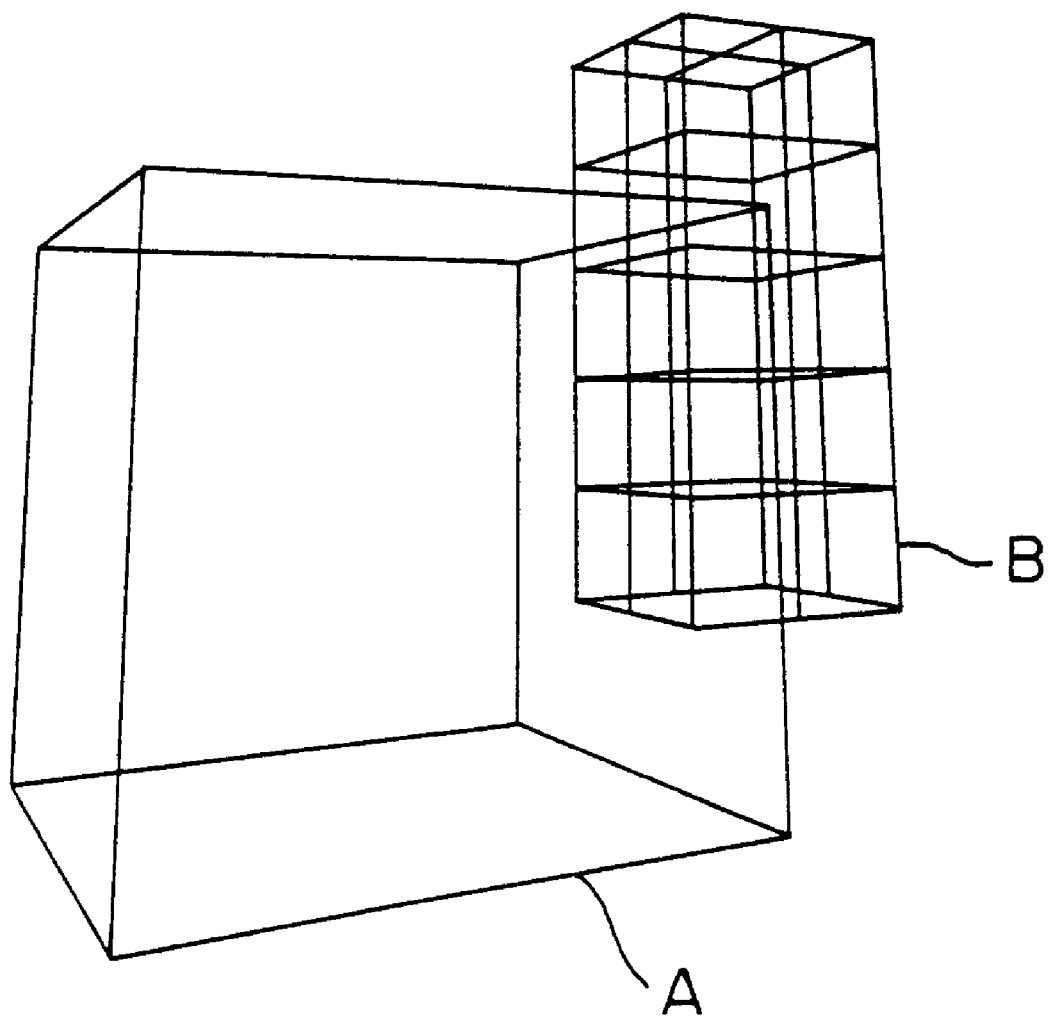
FIG. 16 shows an example in which the object includes invisible portions in a display region.

FIG. 16 shows an example where object B is placed behind object A when a camera position (or visual point) for projection transformation is located at the back off to the left. In this case, a portion of object B (the portion which is located behind object A) is invisible from the camera position. Accordingly, if a data base of the objects is constructed by omitting polygons of the invisible portion, the amount of operations for the three-dimensional graphics display decreases.

Figure 17:
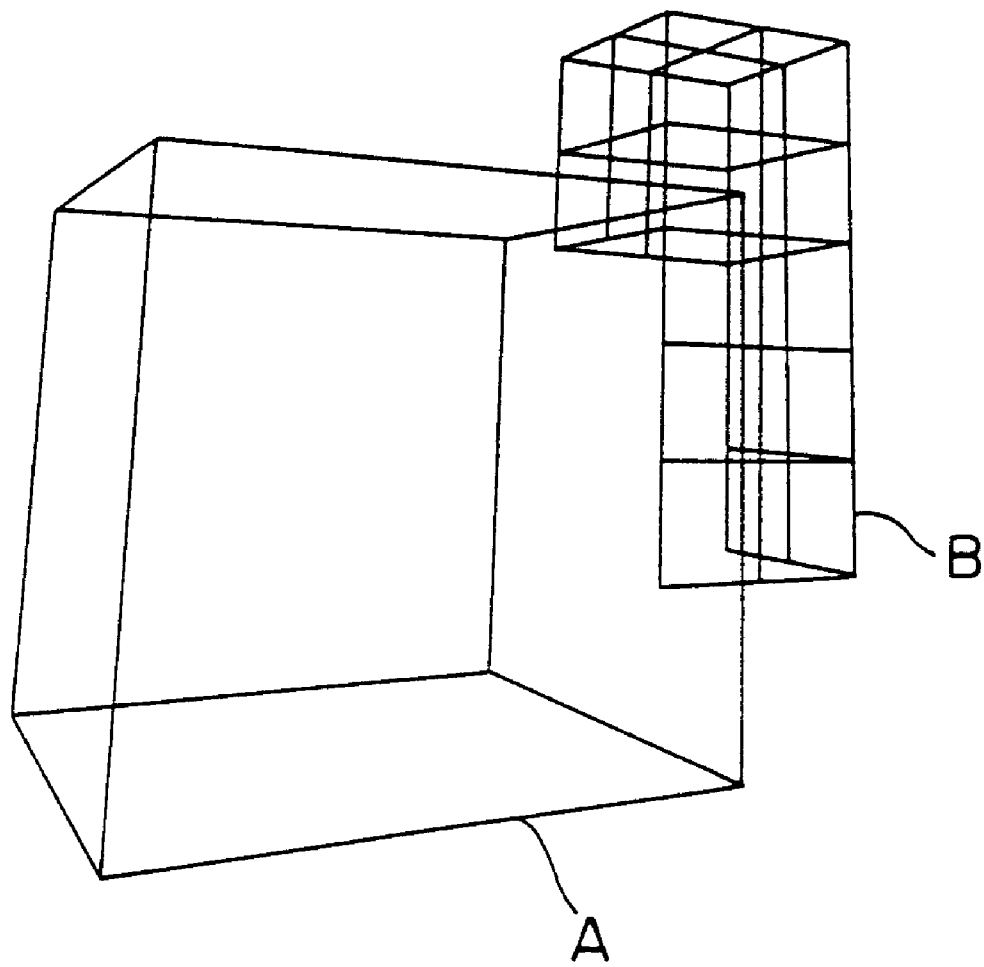
FIG. 17 shows an example in which the invisible portions (polygons) of the object have been deleted.

FIG. 17 shows an example where polygons of object B are partly omitted. Even if such omission of polygons is conducted, a resultant picture on the plane of projection as seen from the camera is the same as that of FIG. 16.

For example, in a car race, cars run on a previously determined course. The course is divided into portions in unit length. Concerning scenes which can be seen from the camera for each unit, a data base is previously made in the form of, for example, background and a set of objects, and data of a relevant scene is read out according to the position of a car and is displayed as background, etc. on the screen. Accordingly, it is possible to provide a data base which requires a smaller amount of operations with a game device by reducing the polygons which cannot be actually seen from the camera.

An explanation is hereinafter given with reference to drawings about a method of constructing a data base of objects with some polygons which cannot be seen from the camera position within the display region being omitted.

Figure 18:
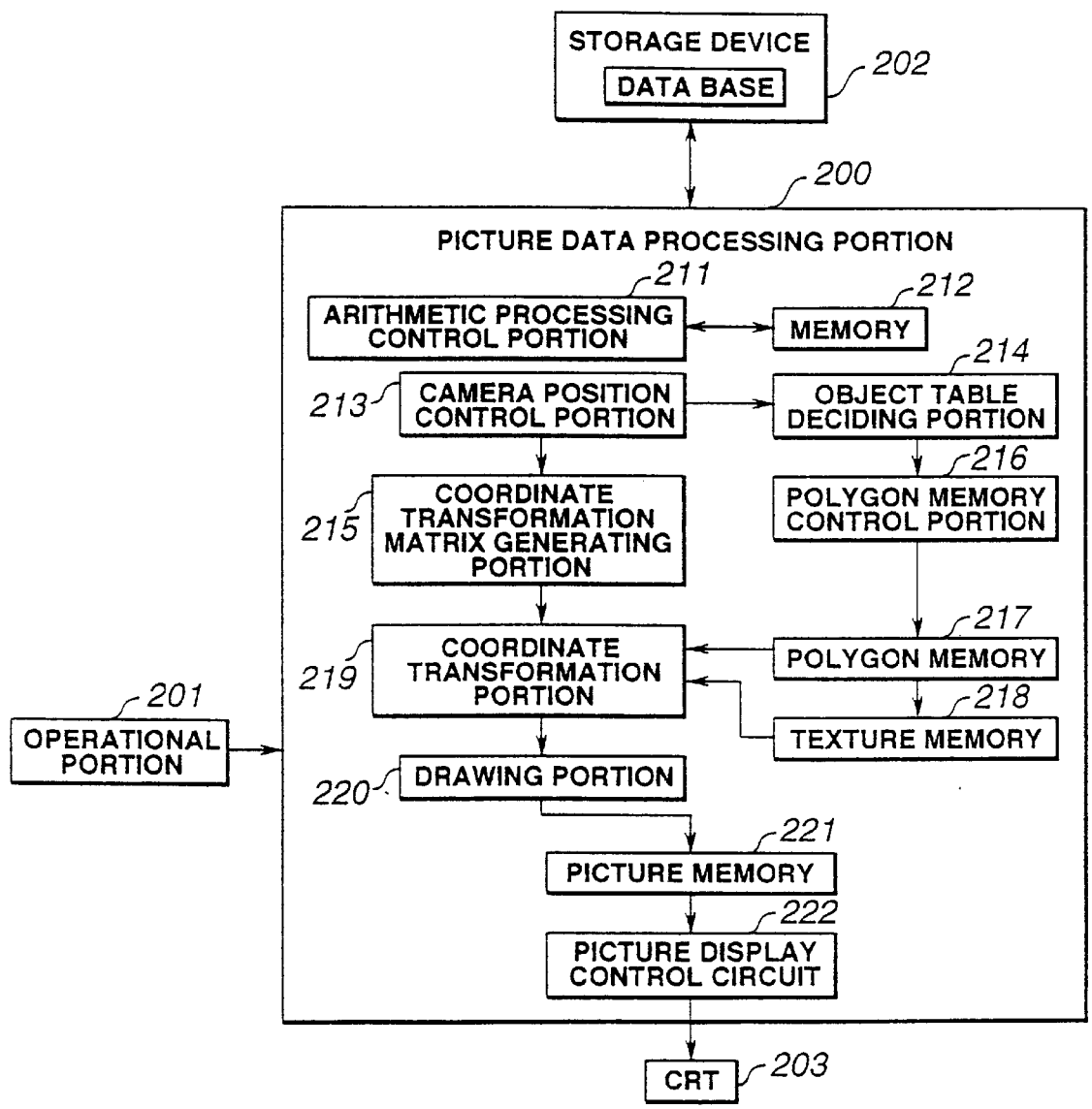
FIG. 18 is a block diagram which explains the outline of a picture data processing device.

First, the outline of a picture data processing device for executing an algorithm described below is explained by referring to FIG. 18. The picture data processing device is composed of a computer system, which is divided roughly into: a data processing portion 200; an operation portion 201; a storage portion 202 for retaining data bases such as object tables and polygon data; and a CRT display portion 203 for displaying pictures. The data processing portion 200 is composed of: an arithmetic processing control portion 211 for controlling respective parts in accordance with programs retained in a memory 212; a camera position control portion 213 for setting coordinates of a camera (or visual point) position in the three-dimensional virtual space in accordance with movements of a car or game programs; an object table deciding portion 214 for deciding an object table corresponding to the camera position by referring to the camera position; a coordinate transformation matrix generating portion 215 for generating a matrix of coordinate transformation corresponding to the camera position; a polygon memory control portion 216 for designating relevant polygons by referring to the object table; a polygon memory 217 for outputting the designated polygon data; a texture memory 218 for retaining textures to be pasted on the polygons; a coordinate transformation portion 219 for locating the polygons in the three-dimensional virtual space, pasting the textures on the polygons, and performing, for example, projection transformation by means of the above-mentioned transformation matrix to transform the polygons into an image on the two-dimensional screen; a drawing portion 220 for outputting a screen picture to a picture memory 221; a picture display control circuit 222 for outputting picture data retained in the picture memory 221 as picture signals to a CRT display.

Figure 19:
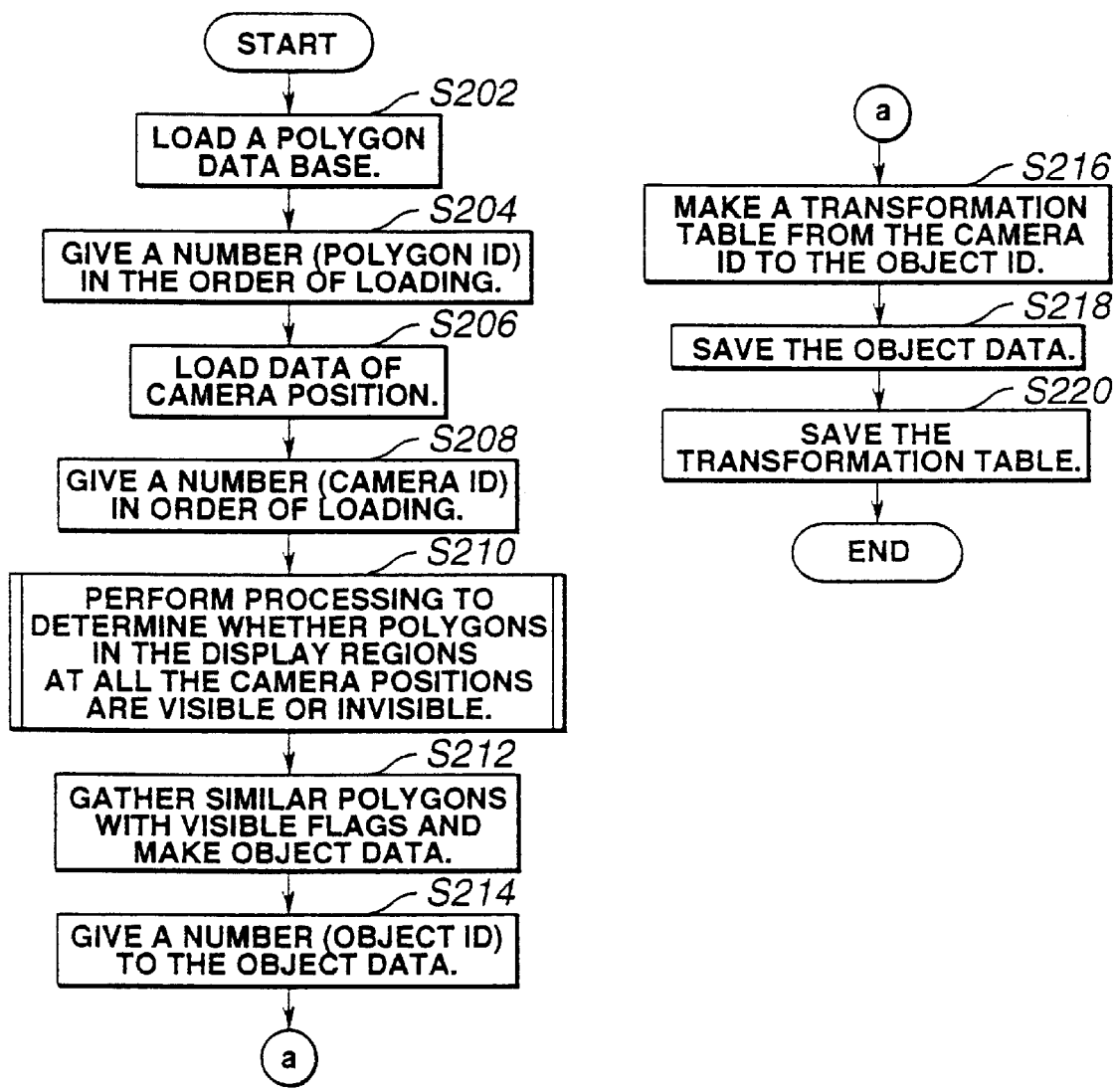
FIG. 19 is a flowchart explaining an example of formation of an object data base by deleting polygons which are invisible from a camera in the display region.

FIG. 19 is a flowchart which explains an algorithm to construct a data base of objects with some polygons which cannot be seen being omitted, by using a conventional object data base.

At first, a data base of three-dimensional graphics is composed by a conventional method or a data base of three-dimensional graphics which has already been composed is prepared. Data of all polygons is loaded from the data base onto a work area of a CPU memory. The polygon data includes coordinate data (S202). A number for identification (or polygon ID) is given to each polygon. For example, the polygons are numbered in the order of loading (S204).

Data of the camera position is loaded onto the work area. The camera position data includes coordinates and a facing direction (or vector) of the camera (S206). The number for identification (or camera ID) is given to the camera position data. For example, the camera position is numbered in the order of loading (S208).

Subsequently, concerning all the camera positions, a visibility determining processing as to whether each polygon can be seen from the camera positions is performed (S210).

Figure 20:
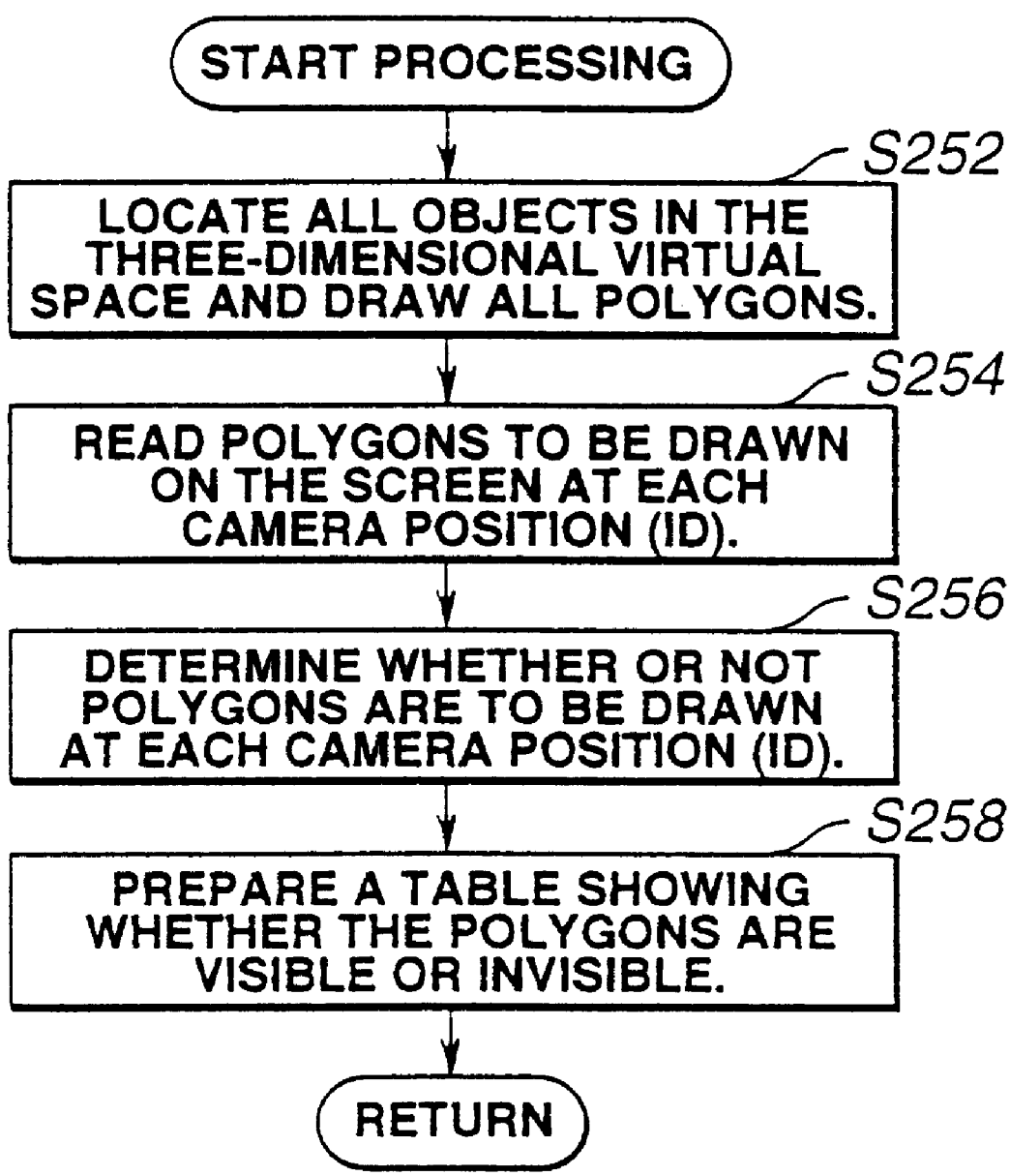
FIG. 20 is a flowchart explaining an example in which it is determined whether the polygons are visible or invisible.

FIG. 20 is a flowchart showing an algorithm of the visibility determining processing. This processing locates all the objects in the three-dimensional virtual space formed in the computer system and draws all the polygons. In doing so, it gives a relevant polygon ID number to picture elements of each polygon (S252). It performs coordinate transformation, etc. at each camera position (or camera ID) and then draws a projected picture as seen from the camera. At this time, a method such as the so-called Z buffer method is used to draw, among overlapping polygons in the display regions, the polygons located in front as visible polygons and not to draw the polygons located in the back (S254). It is determined at each camera position according to the polygon ID given to the drawn picture element which polygons are to be drawn or not to be drawn on the screen (S256). A visible flag table showing which polygons are visible or invisible at all the camera positions (or camera ID) is prepared (S258). Then, the processing returns to the original routine.

FIG. 21 shows an example of the visible flag table. It shows, regarding all polygons at all the camera positions (or camera ID), whether or not a relevant polygon can be seen from a relevant camera position (or camera ID). If it can be seen, a flag "1" is displayed. If it cannot be seen, a flag "0" is displayed.

Figure 22:
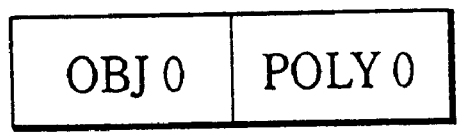
FIG. 22 explains how polygon data are made into object groups.
Figure 22:
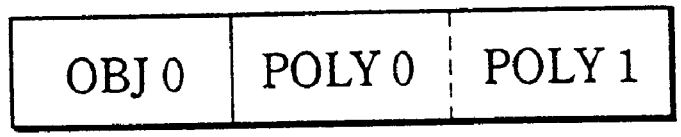
Figure 22:
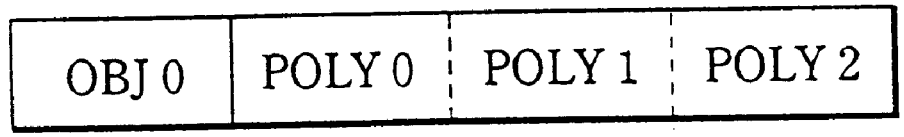

Subsequently, in order to obtain a data base which represents objects to be drawn at each camera position, polygons which have the same or similar patterns of visible flags in the visible flag table are made into a group and each group constitutes object data (S212). An identification number (or object ID) is given to each object data (S214).

this procedure is hereinafter explained. Firstly, since a polygon (for example, POLY4) having a flag pattern with all "0" cannot be seen on the screen, it is unnecessary to consider it as an object to be drawn. Such a polygon is extinguished. Secondly, as shown in FIG. 22(*a*), a first polygon POLY0 is put in object data OBJ0. Thirdly, all polygons with flag patterns which coincide with the flag pattern of the polygon POLY0 are extracted and added to the object data OBJ0 (FIG. 22(*b*)). The above steps 2 and 3 are repeated regarding the rest of the polygons, and polygons having the same flag patterns are gathered and made into groups and the respective groups are named object data OBJ1, OBJ2 and so on.

Next, polygons with similar flag patterns to those of the object data are extracted and incorporated into the relevant object data (FIG. 22(*c*)). For example, polygons with flag patterns which are different by one bit from a pattern obtained by a logical sum of flag patterns of the respective polygons in the object data are extracted and incorporated into the object data. The same procedure is repeated and the polygons are made into groups (or object data) until the flag patterns which are different by predetermined bits are checked.

Subsequently, a transformation table showing object data which are to be drawn (or can be seen) at each camera position is prepared (S216). FIG. 23 shows an example of this transformation table. Objects to be located at each camera position (or camera ID) in the three-dimensional virtual space can be found immediately by referring to this table.

For example, at camera position 0, object data OBJ0, OBJ1, OBJ3 and so on are located. At camera position 1, object data OBJ0, OBJ3 and so on are located. With a game device, the camera position is selected in accordance with developments of a game, and relevant object data groups are read from the transformation table and polygons composing each object are drawn, thereby drawing each scene.

Moreover, the object data are stored in a data base (S218). The transformation table of the objects is stored in a data base (S220).

It is also possible to execute the above-described algorithm at a high speed by using a picture processing computer system separate from a video game device and to store, on an information storage medium, the resultant data base of object data as game software together with programs.

Figure 24:
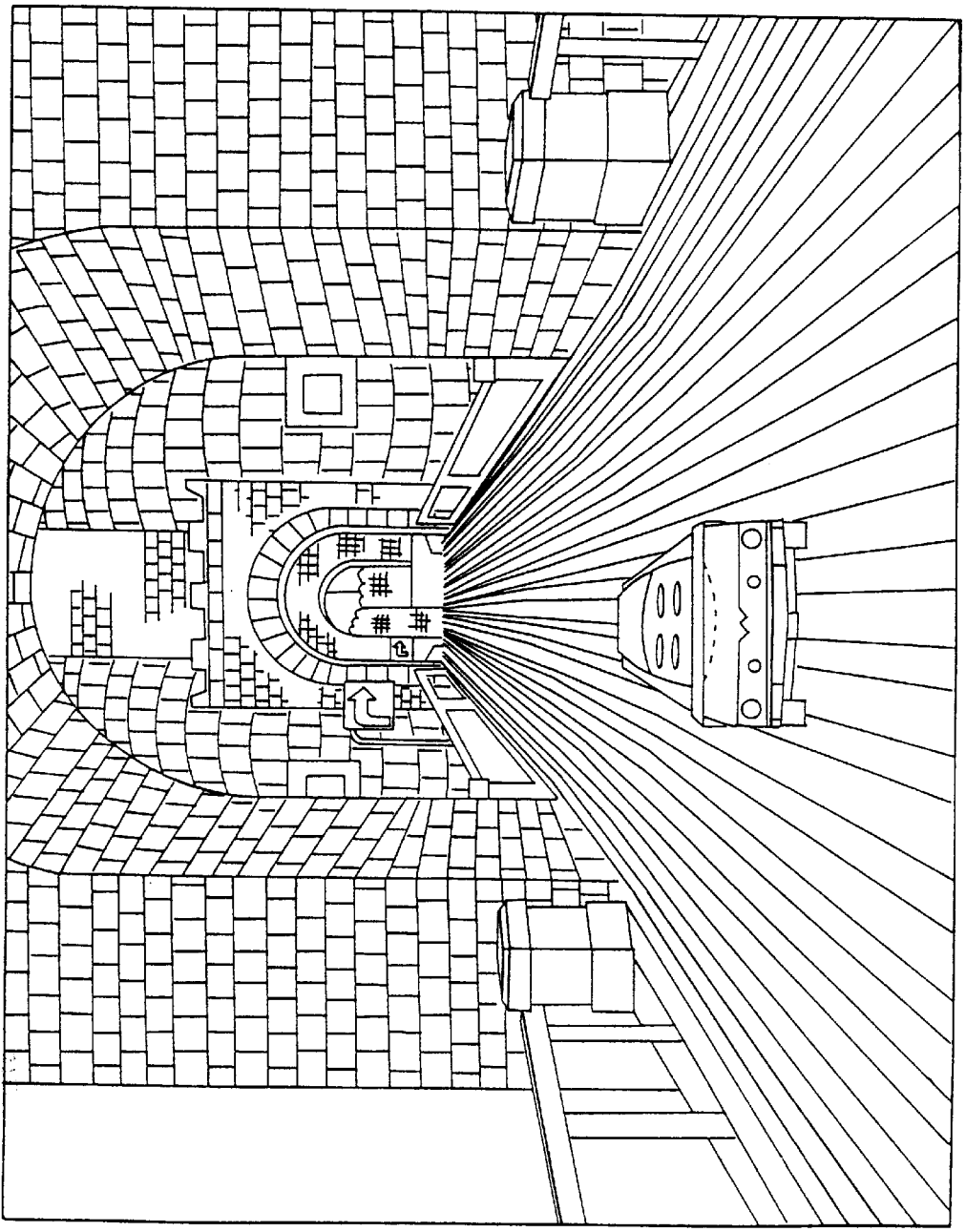
FIG. 24 shows a picture drawn in a three-dimensional mode as seen from a normal visual point.
Figure 25:
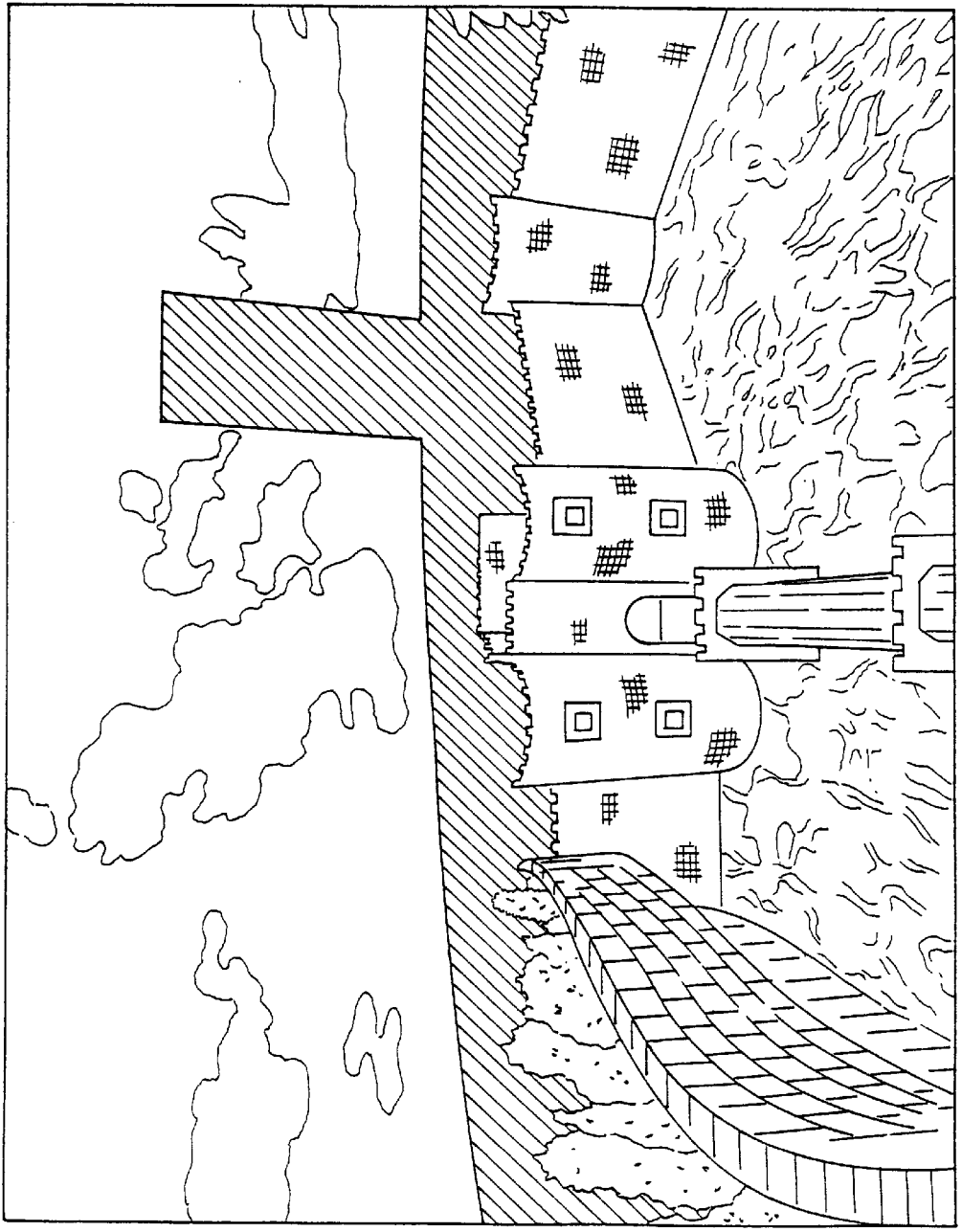
FIG. 25 shows a picture when the visual point is moved upward in the same three-dimensional virtual space as that of FIG. 24.

FIGS. 24 and 25 show examples of pictures drawn by using object data with polygons which cannot be seen in the display region being omitted. FIG. 24 shows an example of one scene at a regular camera position during a car race with cars running in a game field formed in the three-dimensional virtual space. FIG. 25 shows the same scene as seen from above. In the region indicated with oblique lines in FIG. 25, no polygons are drawn and no picture exists. Accordingly, the amount of operations necessary to, for example, construct the virtual space or transform pictures for such a region is reduced.

Application of clipping to objects existing in view as described above is not limited to video games like the above-described embodiments. For example, it can be applied to anything which displays the state of the three-dimensional virtual space by transforming it into two-dimensional pictures, such as various kinds of simulation for virtual experience. As described above, since this invention is capable of expressing flares caused by incident rays from a light source, it is possible to enjoy dazzling scenes for dramatically presented scenes.

Moreover, this invention makes it possible to draw traces of moving objects such as cars or skis without comparatively increasing the number of polygons, which is a desirable feature.

Furthermore, by a picture forming method of this invention, an object data base is formed by clipping invisible polygons in the display region. Therefore, it is possible to draw the same pictures as those drawn by conventional methods by spending a smaller amount of operations than that of the conventional methods.

What is claimed is:

1. A game device for displaying, as a picture, a scene having come into view by moving a visual point in a three-dimensional virtual space, said game device comprising flare processing means for forming a flare in said picture when a light source exists within view of said visual point, said flare processing means comprising:

line-of-sight vector generating means for obtaining a line-of-sight vector which shows a line-of-sight direction of said visual point;

ray vector generating means for obtaining a ray vector which shows a direction of the light source from said visual point;

inner product calculating means for calculating an inner product of said line-of-sight vector and say ray vector; and flare forming means for forming a flare having intensity according to said inner product in said picture.

2. A game device according to claim 1, wherein said flare processing means further comprises determining means for activating said flare forming means on the basis of results of comparison of said inner product with a reference value.

3. A game device according to claim 1, wherein said flare forming means increases a degree of whiteness of said picture in accordance with said inner product.

4. A game device according to claim 1, wherein said flare forming means forms a picture of a flare polygon having transparency according to said inner product.

5. A game device according to claim 1, wherein said flare forming means conducts, with said inner product being between a predetermined upper limit and a predetermined lower limit, the processing to add whiteness to the picture according to said inner product and/or the processing to form a flare polygon having transparency according to said inner product.

6. A game device according to claim 1, wherein said flare forming means forms said flare on a straight line linking said visual point with said light source.

7. A game device according to claim 1, wherein said game device further comprises a medium with a program stored thereon for making a computer system function as a game device.

8. A game device for displaying, as a picture, a scene having come into view by moving a visual point in a three-dimensional virtual space, said game device comprising flare processing means for forming a flare in said picture when a light source exists within view of said visual point, said flare processing means determining a degree of said flare in accordance with a position of said light source within view and/or intensity of said light source.

9. A game device according to claim 8, wherein said flare processing means determines the degree of said flare by referring to a table containing a group of flare values, said table matching the degree of said flare to the position of said light source within view and/or the intensity of said light source.

10. A game device according to claim 8, wherein said flare processing means finds the degree of said flare by using a function including as a variable of the position of said light source within view and/or the intensity of said light source.

11. A game device according to claim 8, wherein said flare processing means expresses the flare by displaying, on a screen, a flat figure having a comparatively higher degree of whiteness than that of the background or a hollow flat figure.

12. A game device according to claim 11, wherein said flare processing means repeats display and no display of said flare in a short period of time.

13. A game device according to claim 8, wherein said flare processing means displays a plurality of said flares on a straight line corresponding to an incident ray.

14. A game device according to claim 12, wherein said plurality of flares displayed include similar figures.

15. A game device according to claim 8, wherein said light source is a virtual sun located in said three-dimensional virtual space, said sun being relocated from a normal position in said three-dimensional virtual space to a position within view of a predetermined scene in order to generate said flare in said picture on the predetermined scene.

* * * * *